United States Patent
Piccinino, Jr. et al.

(10) Patent No.: US 6,896,425 B2
(45) Date of Patent: May 24, 2005

(54) QUEUING ARRANGEMENT FOR PHOTOGRAPHIC MEDIA TO BE SCANNED

(75) Inventors: Ralph L. Piccinino, Jr., Rush, NY (US); Ronald W. Grant, Jr., Calendonia, NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 10/675,012

(22) Filed: Sep. 30, 2003

(65) Prior Publication Data

US 2005/0069313 A1 Mar. 31, 2005

(51) Int. Cl.⁷ .................................................. G03D 3/08
(52) U.S. Cl. .................... 396/567; 396/612; 355/27; 355/40; 355/41; 355/72; 355/75
(58) Field of Search ................................ 396/567, 612; 355/27–29, 40, 41, 72, 75

(56) References Cited

U.S. PATENT DOCUMENTS

| | | |
|---|---|---|
| 3,792,651 A | 2/1974 | Banks |
| 3,986,537 A | 10/1976 | Wilhere |
| 4,005,463 A | 1/1977 | Kowalski |
| 4,013,412 A | 3/1977 | Mukae |
| 4,178,088 A | 12/1979 | Harding |
| 4,269,501 A | 5/1981 | Griffith et al. |
| 4,277,159 A | 7/1981 | Descotes |
| 4,431,294 A | 2/1984 | Baker |
| RE34,188 E | 3/1993 | Kuzyk et al. |
| 5,349,412 A | 9/1994 | Miyasaka |

Primary Examiner—D. Rutledge
(74) Attorney, Agent, or Firm—David A. Novais

(57) ABSTRACT

The present invention relates to a processing arrangement that includes a processing section and a scanning section. The scanning section includes a scanner that is adapted to scan processed photographic film. The scanning section also includes a plate member with a guide slot therein and a plurality of film holding casings movably located in the guide slot. The film holding casing are adapted to receive the processed dried film from the processing section and queue the processed dried film for scanning in the scanner. With the arrangement of the present invention, it is possible to collect and queue multiple films to be scanned.

7 Claims, 36 Drawing Sheets

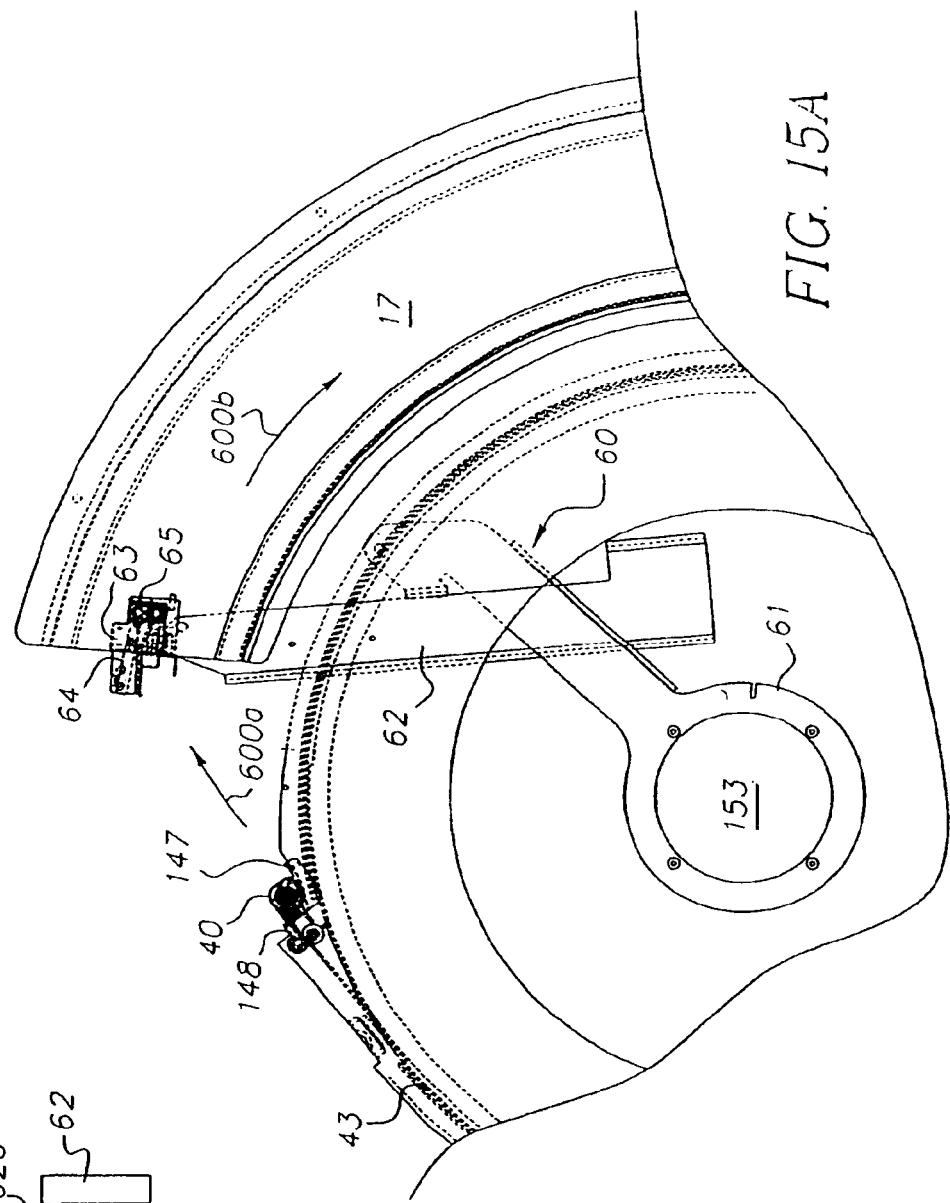
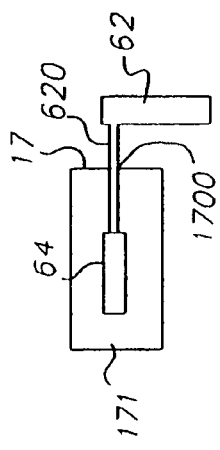
FIG. 15A
FIG. 15B

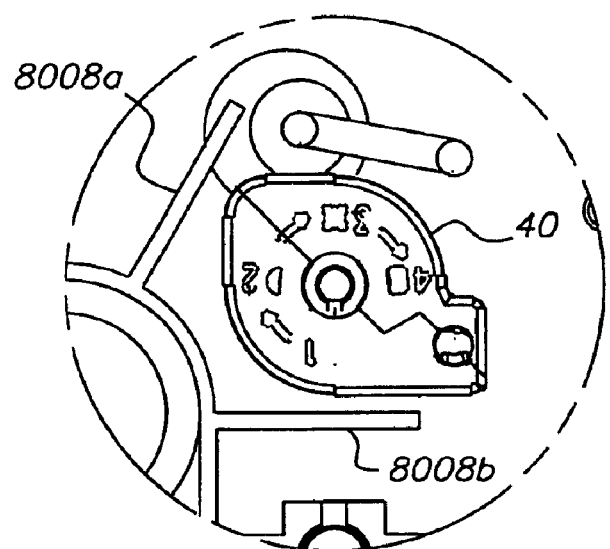
FIG. 28  DETAIL A
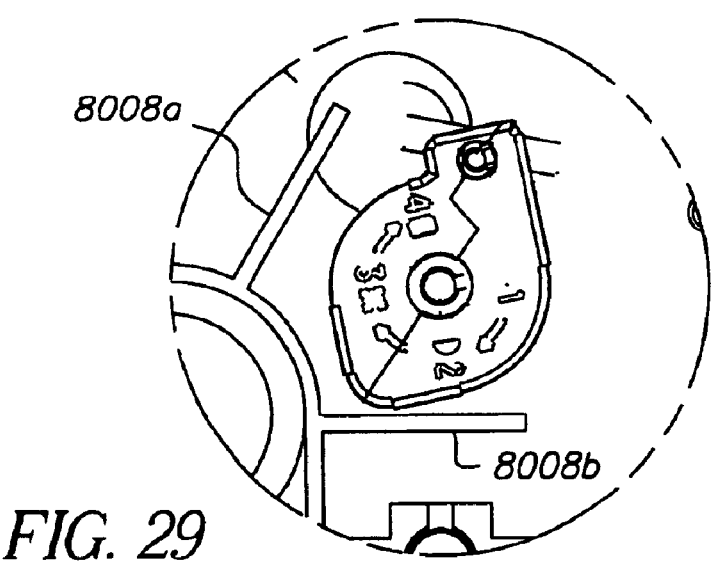
FIG. 29  DETAIL B

QUEUING ARRANGEMENT FOR PHOTOGRAPHIC MEDIA TO BE SCANNED

CROSS REFERENCE TO RELATED APPLICATIONS

The present application is related to the following patents and pending patent applications: U.S. Pat. No. 6,485,202 issued Nov. 26, 2002, entitled PHOTOGRAPHIC PROCESSOR AND METHOD OF OPERATION; U.S. Pat. No. 6,595,705 issued Jul. 22, 2003 entitled PHOTOGRAPHIC PROCESSOR HAVING A WASHING ASSEMBLY; U.S. patent application Ser. No. 10/281,710 filed Oct. 28, 2002, entitled PHOTOGRAPHIC PROCESSING DRUM HAVING A CENTRALLY LOCATED PROCESSING SOLUTION DELIVERY SYSTEM; U.S. patent application Ser. No. 10/293,651 filed Nov. 13, 2002, entitled DUAL GROOVE PHOTOGRAPHIC PROCESSING DRUM; U.S. patent application Ser. No. 10/307,911 filed Dec. 2, 2002, entitled A PHOTOGRAPHIC PROCESSING DRUM HAVING A CIRCULAR DRYING CYLINDER; and U.S. patent application Ser. No. 10/307,787 filed Dec. 2, 2002 entitled A PHOTOGRAPHIC PROCESSING DRUM HAVING A CIRCULAR MEDIA HOLDING CYLINDER AND A LINEAR DRYER.

FIELD OF THE INVENTION

The present invention is directed to a photographic processing arrangement having a queuing section for holding processed media such as photographic film to be scanned.

BACKGROUND OF THE INVENTION

Photographic processors come in a variety of shapes and sizes from large wholesale photographic processors to small micro-labs. As photographic processors become more and more technologically sophisticated, there is a continued need to make the photographic processor as user-friendly and as maintenance-free as possible.

Due to the increased throughput of processors such as circular processors, which preferably process one roll of film at a time, it is necessary to remove the processed film from the processing chamber of the processor to permit the processing of another roll or strip of film. The removed processed film then gets dried and delivered to a scanner. However, the scanner speed may be slower than the processing speed of the processor, so that the scanning of the next roll of processed film as well as the film processing operation needs to be delayed to wait for the scanning operation.

SUMMARY OF THE INVENTION

The present invention addresses some of the drawbacks noted above by the discovery of a queuing section or arrangement for holding processed photographic film to be scanned. With the arrangement of the present invention, the throughput of a processing machine increases, and the scanner speed and the film processing speed associated with the photographic processor do not have to match. Further, due to the queuing section of the present invention, multiple films can be dried and collected while waiting to be scanned.

The present invention therefore provides for a film processing arrangement that comprises a processing section that is adapted to process a photographic film to develop an image on the photographic film; and a scanning section that includes a scanner adapted to scan the processed photographic film. The scanning section of the present invention comprises a plate member that has a guide slot therein and a plurality of film holding casings movably located in the guide slot. Each of the film holding casings is movable to a receiving position along the guide slot in a vicinity of an outlet of the processing section and is adapted to receive a processed film from the processing section and hold the processed film therein. Each of the film holding casings is further adapted to transfer the processed film held therein from the film holding casings to the scanner.

The present invention further relates to a film processing arrangement that comprises a processing section adapted to process a photographic film; and a scanning section including a scanner adapted to scan the processed photographic film, with the scanning section comprising a plate member having a guide slot therein and a plurality of film holding casings movably located in the guide slot. Each of the film holding casings are movable to a receiving position along the guide slot in a vicinity of an outlet of the processing section and are adapted to receive a processed film from the processing section and hold the processed film therein. Each of the film holding casings are further adapted to transfer processed film held therein from the film holding casing to the scanner.

The present invention also relates to a method of processing photographic film which comprises the steps of supplying a film to be processed to a film processing section of a processing arrangement; processing the film to develop images on the film; transferring the film from the processing section to a film holding casing, wherein the film is rolled up in the holding casing; and transferring the film from the holding casing to a scanner.

The present invention also relates to a processing arrangement which comprises a film processing section adapted to remove a photographic film from a cartridge to process the photographic film and return the processed photographic film back into the cartridge; and a scanning section including a scanner adapted to scan the processed photographic film. The scanning section comprises a conveyor adapted to hold and convey multiple cartridges having the processed photographic film therein and convey the cartridges to an entrance of the scanner, to permit a transfer of the processed film from the cartridge to the scanner.

These and other features and advantages of the present invention will become apparent after a review of the following detailed description of the disclosed embodiments and the appended claims.

BRIEF DESCRIPTION OF THE DRAWINGS

The present invention is further described with reference to the appended figures, wherein:

FIGS. 15A and 15B depicts an exemplary film transfer arm, which transfers film from a circular processing drum to a dryer;

FIGS. 28–29 are detail views of elements of the scanning section of FIG. 27.

DETAILED DESCRIPTION OF THE INVENTION

Figure 1:
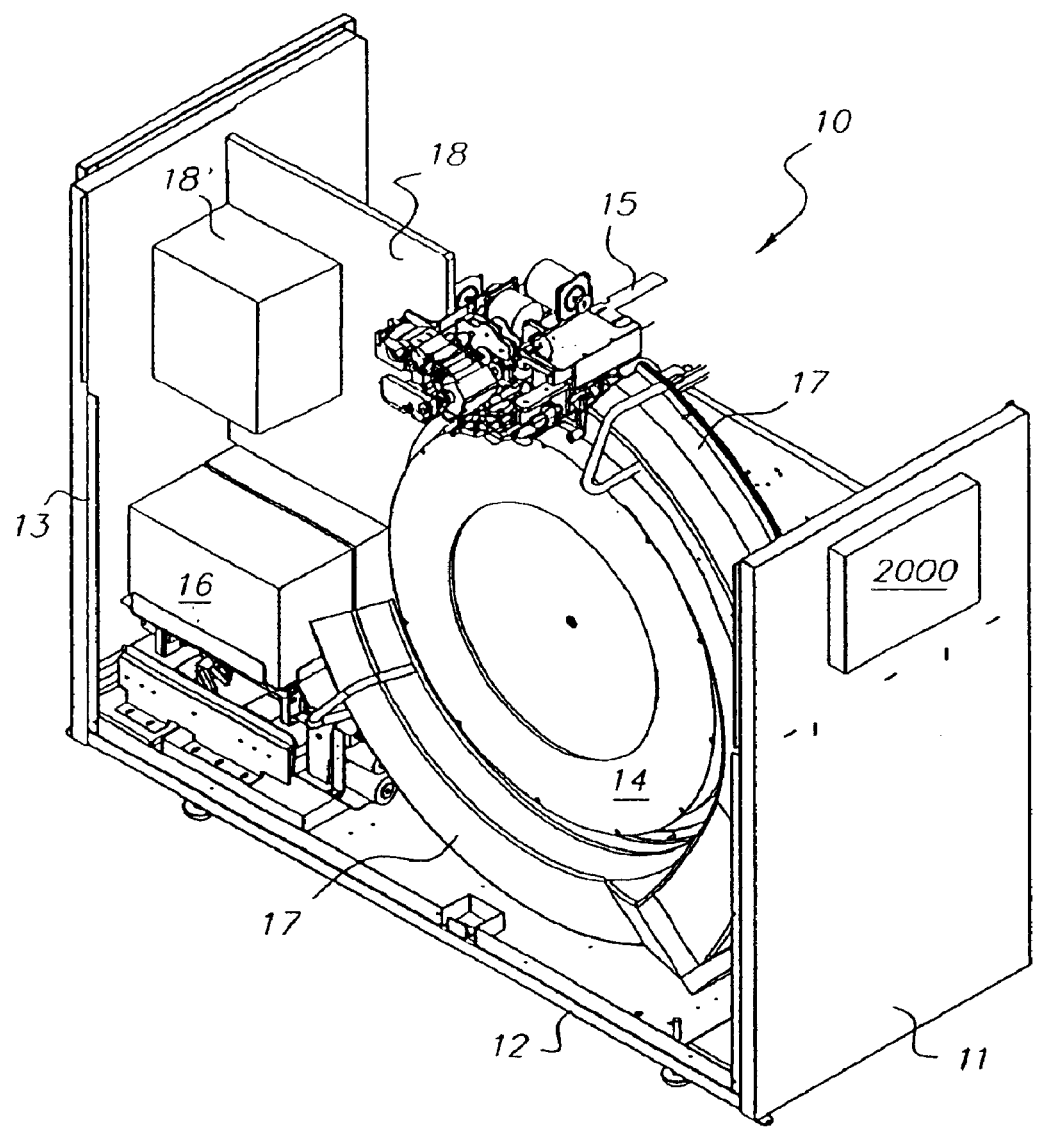
FIG. 1 is a frontal view of an exemplary photographic processor of the present invention.

An exemplary photographic processing arrangement or processor is shown in FIG. 1. Photographic processor 10 comprises at least an outer housing, which includes a first side wall 11, a base housing member 12, and a second side wall 13. Photographic processor 10 includes a circular processing chamber or drum 14 (also referred to herein as the "circular processing drum 14"), which may be used to expose a given strip or roll of film to one or more photo-processing chemicals. Photographic processor 10 further includes a film-loading/unloading device 15 positioned above and cooperating with circular processing drum 14. A chemical delivery system 16 is positioned for easy access by a user (i.e., for maintenance or replacement purposes) at a location near side wall 13 and base housing member 12. Photographic processor 10 also includes a circular dryer 17 in the form of, for example, a cylinder, for drying the processed film. Dryer 17 is concentrically and co-axially positioned around processing drum 14. Once a given strip or roll of film is dried in dryer 17, the film proceeds to a scanner 18', which may be positioned above chemical delivery system 16 in a space bordered by side wall 13 and left interior wall 18 or any other convenient location.

Figure 2:
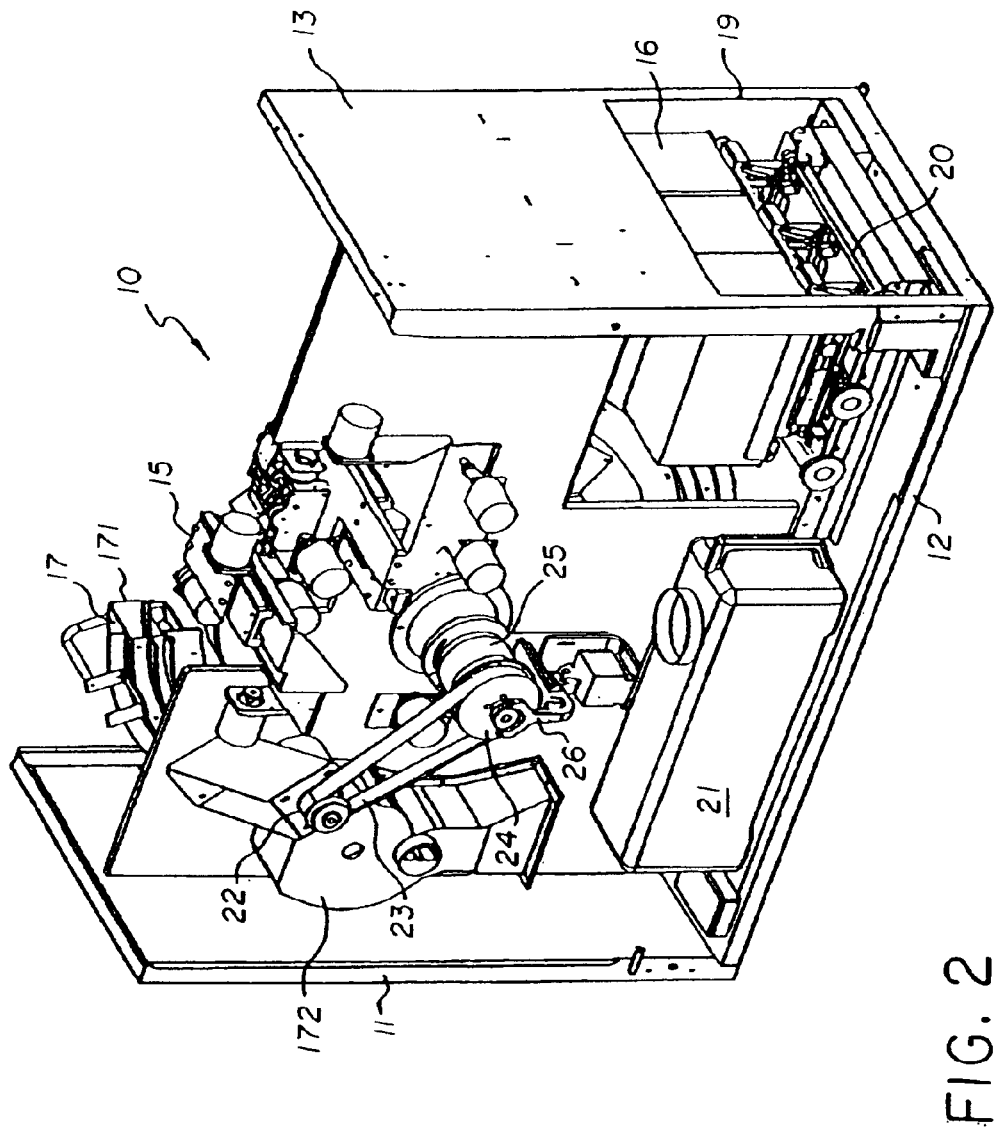
FIG. 2 is a rear view of an exemplary photographic processor of the present invention.

FIG. 2 depicts a rear view of photographic processor 10. As shown in FIG. 2, photographic processor 10 includes opening 19 in side wall 13 for accessing chemical delivery system 16. Sliding track mechanism 20 allows an operator to pull at least a portion of chemical delivery system 16 through opening 19 to an exterior location outside of photographic processor 10. Such an assembly allows for quick and easy maintenance and replacement of chemical delivery system 16. Photographic processor 10 can include a waste collection reservoir 21, which collects and stores used processing chemicals removed from circular processing drum 14 following development of a given strip or roll of film. As shown in FIG. 2, dryer 17 includes dryer entrance 171 and dryer blower 172. The various components of photographic processor 10 will be described in more detail below with reference to FIGS. 3–21.

Figure 3:
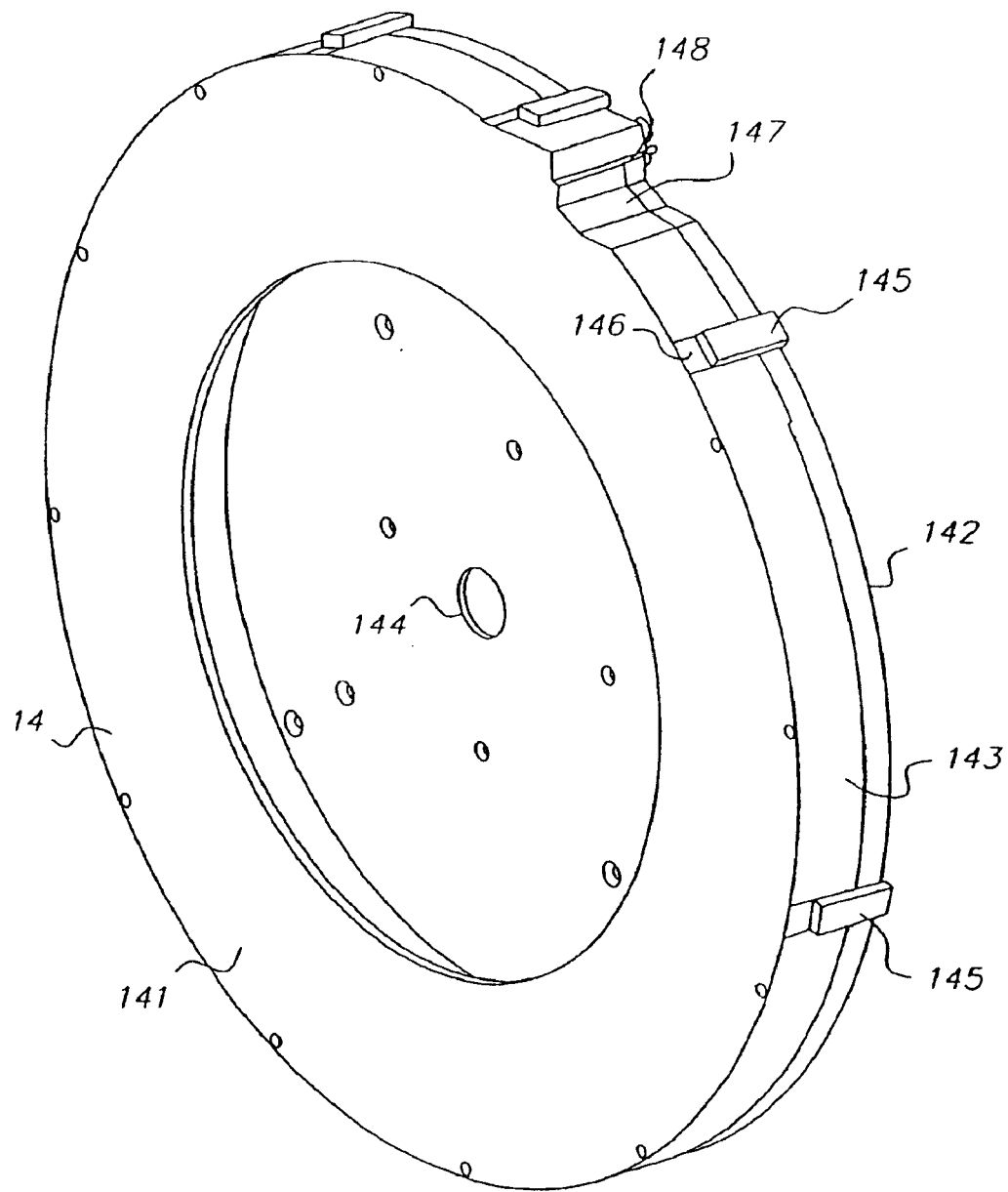
FIG. 3 depicts an exemplary circular processing drum used in the photographic processor of the present invention.

Circular processing drum 14 is further described in FIG. 3. As shown in FIG. 3, circular processing drum 14 includes a first or front wall 141, a second or back wall 142, a side wall 143, and a central axis opening 144. A portion of a drum and disk drive mechanism 25 (shown in FIGS. 2, 8 and 9) passes through central access opening 144. Circular processing drum 14 comprises two circular sections joined together at multiple locations around the perimeter of circular processing drum 14 via male clasping members 145 and female clasping members 146. It should be noted that any means for attaching the two circular components of circular processing drum 14 may be used in place of male clasping members 145 and female clasping members 146. Further, it should be noted that circular processing drum 14 may also be in the form of a single component as oppose to two circular components as shown in FIG. 3, although such a design may add manufacturing cost to circular processing drum 14.

Circular processing drum 14 further comprises a film cartridge loading area 147 on an outer surface of side wall 143 for loading film directly from a film cartridge into circular processing drum 14, such as with APS film. Circular processing drum 14 also comprises a film input slot 148, which enables the entry and exit of film into circular processing drum 14.

Figure 4:
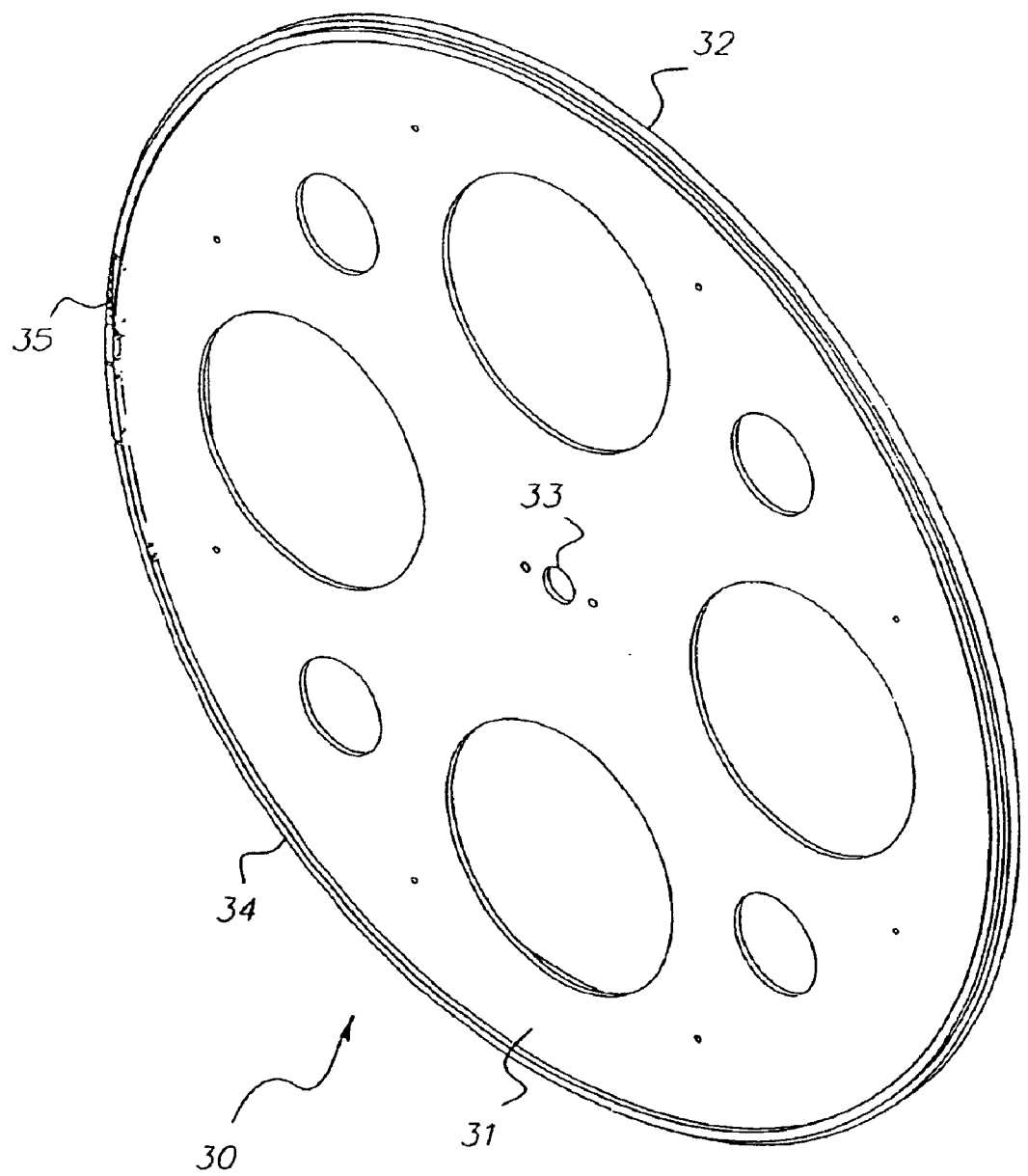
FIG. 4 depicts an exemplary disk located within the circular processing drum of the present invention.
Figure 5:
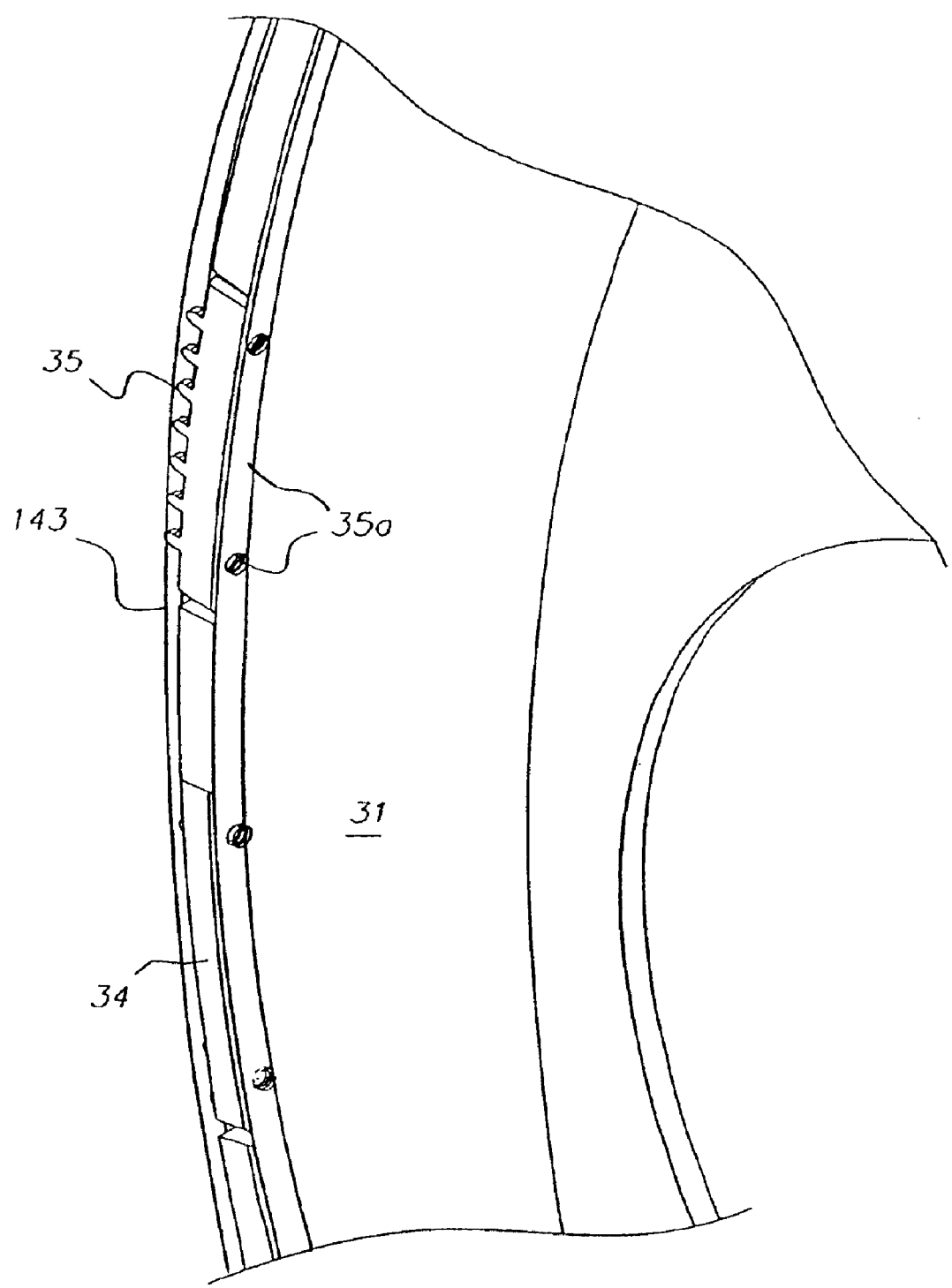
FIG. 5 displays a close-up view of an exemplary disk having an outer perimeter and one or more sets of disk teeth.
Figure 6:
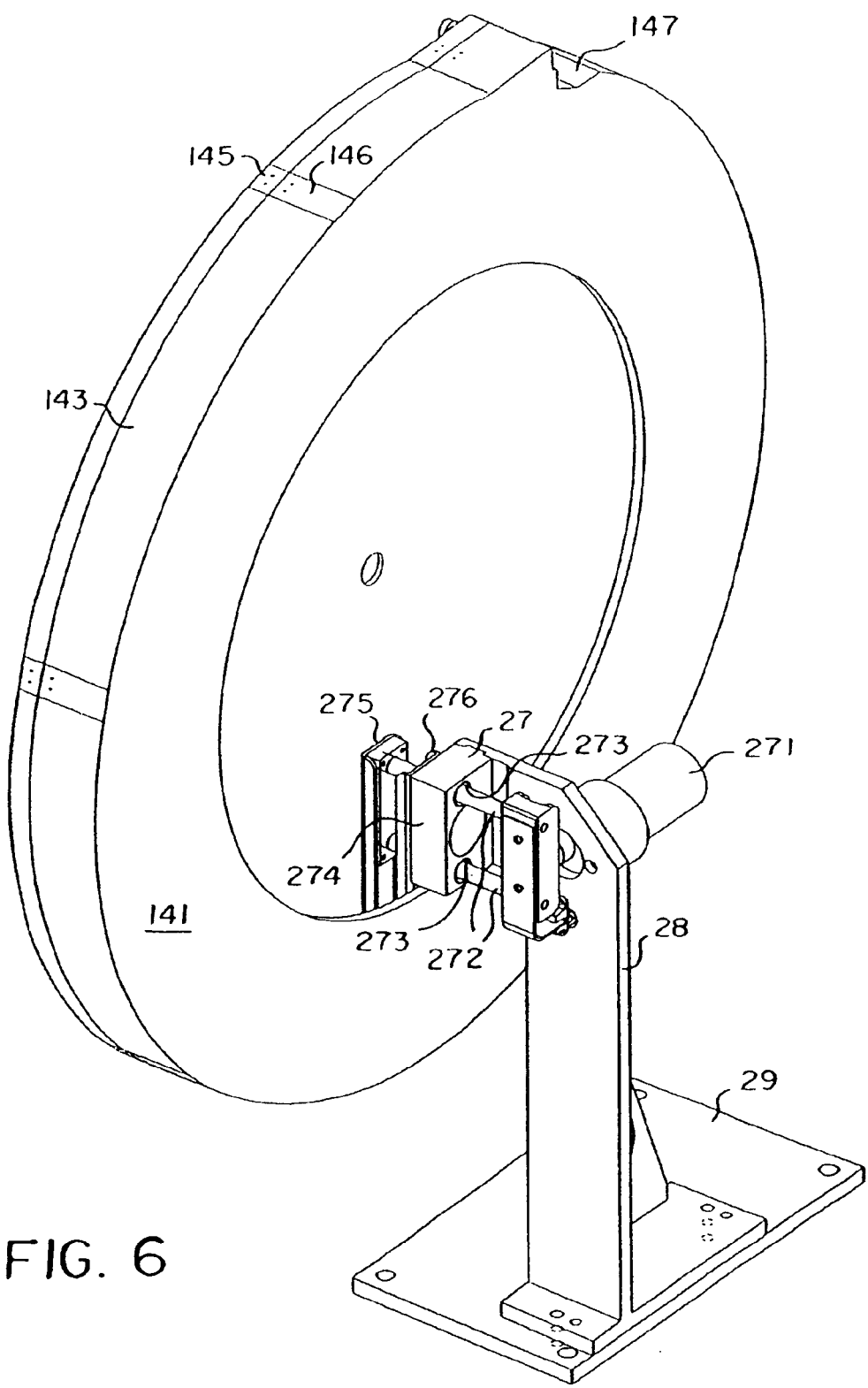
FIG. 6 depicts an exemplary roller mechanism positioned within the circular processing drum.

FIG. 4 depicts an exemplary disk 30, which is positioned within circular processing drum 14, and functions to convey film within circular processing drum 14 once the film enters through film input slot 148. Disk 30 includes a first face 31, a second face 32, a central access opening 33, an outer perimeter 34, and one or more sets of disk teeth 35 located along outer perimeter 34 of disk 30. As with circular processing drum 14, a portion of drum and disk drive mechanism 25 may extend into central access opening 33 to engage with and cause rotation of disk 30. FIG. 5 provides a close-up view of a portion of disk 30, and in particular, outer perimeter 34 and a set of disk teeth 35 on the outer perimeter 34 of disk 30. The outermost points of disk teeth 35 are in close proximity to an inner surface of side wall 143 of circular processing drum 14. In a feature of the invention, disk teeth 35 could be spring loaded through the use of spring arrangement 35a.

Figure 7A:
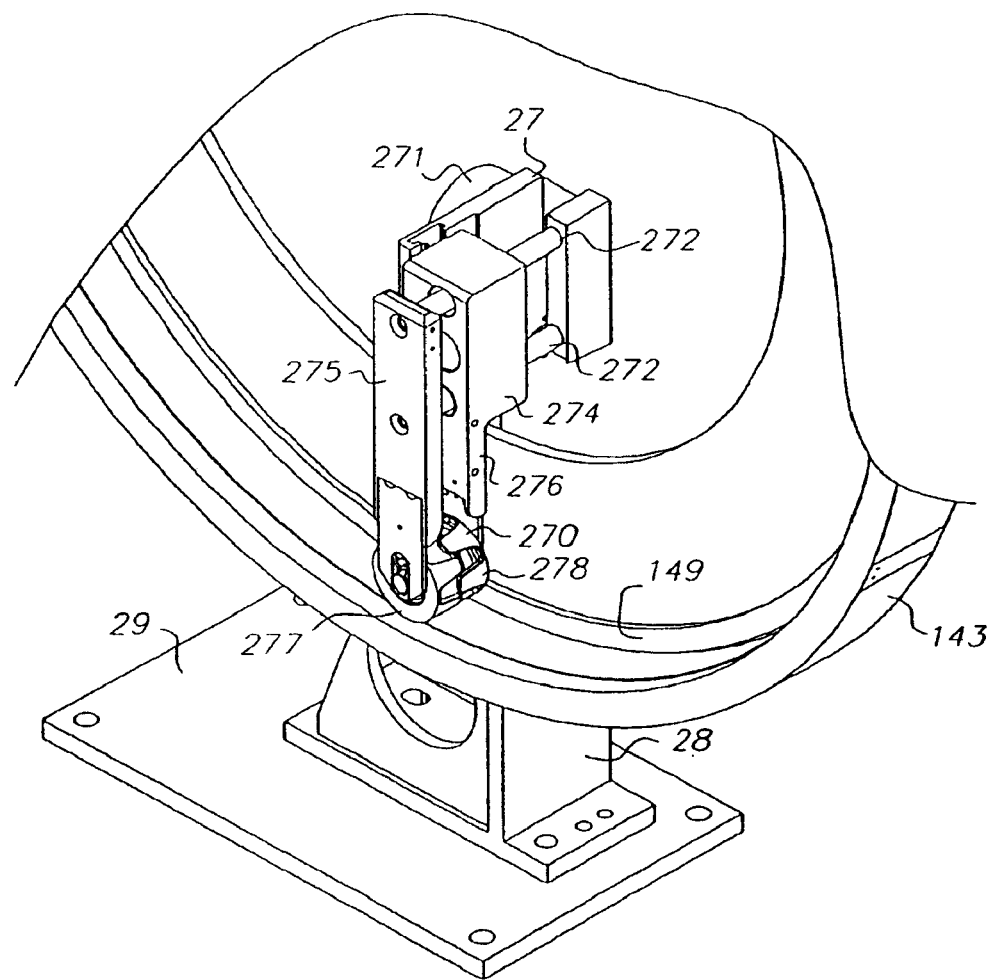
FIGS. 7A–7H depict views of the exemplary roller mechanism of FIG. 6 and illustrate example methods of moving the roller mechanism.

An agitating roller arrangement 27 (FIGS. 6 and 7A) is positioned within circular processing drum 14. Roller arrangement 27 includes an agitating roller 270 having interengaging members 277 and 278 (FIG. 7A). Roller arrangement 27 may be supported by a support member 28, which is attached to a support member base 29. Support member base 29 may be permanently or temporarily attached to base housing member 12 (shown in FIGS. 1 and 2). Agitating roller arrangement 27 includes a motor 271, which provides motion to pistons 272 through openings 273 in a fixed positioning member 274. Pistons 272 proceed through stationary positioning support member 276 and are attached to movable positioning support member 275. As pistons 272 move, movable positioning support member 275 which is coupled to member 277 separates from stationary positioning support member 276 which is coupled to member 278. This permits roller 270 to be expandable between a first width when the members 277 and 278 overlap each other and a second width larger than the first width (FIG. 7A) when the members 277 and 278 move away from each other.

FIG. 7A provides a detailed view of roller arrangement 27 and its various components. As shown in FIG. 7A, movable positioning support member 275 and stationary positioning support member 276 connect to interengaging members 277 and 278 respectively as described above. During use, the film passes between roller 270 and an interior surface of drum 14. Roller 270 is freely rotatable and maintains the film flat along the lower portion of drum 14. As will be described later, roller 270 further provides an agitating feature within processing drum 14 during processing. Additionally, the width of roller 270 is adjustable as described above to accommodate a shorter width film (i.e. APS film) and a larger width film (i.e. 35 mm film). Further, roller arrangement 27 including roller 270 can be vertically adjustable to accommodate for film curl as the film passes between roller 270 and the interior surface of drum 14. As a still further option, roller 270 can be spring loaded so as to accommodate any variation in the interior surface of drum 14.

Figure 7B:
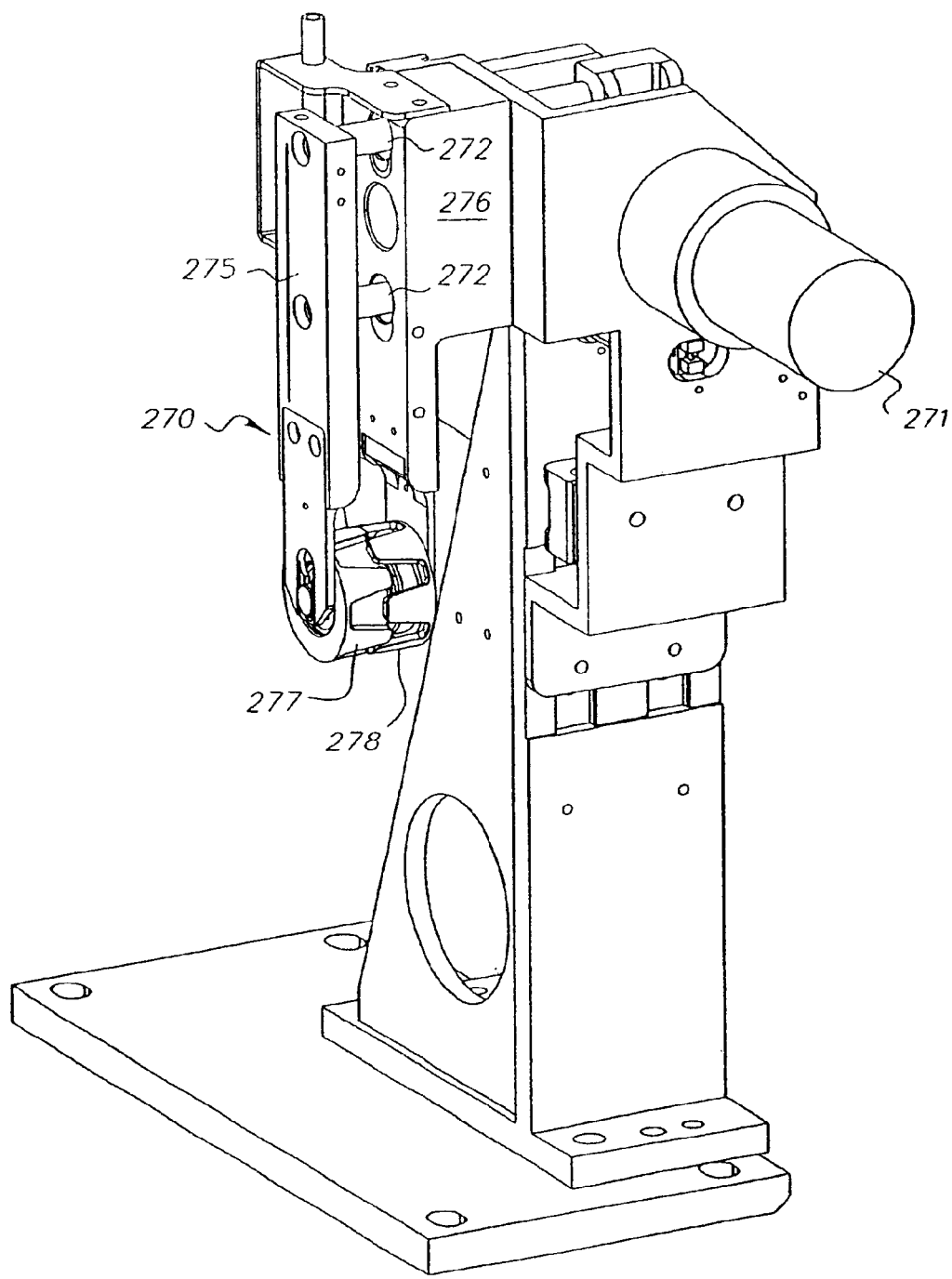
Figure 7C:
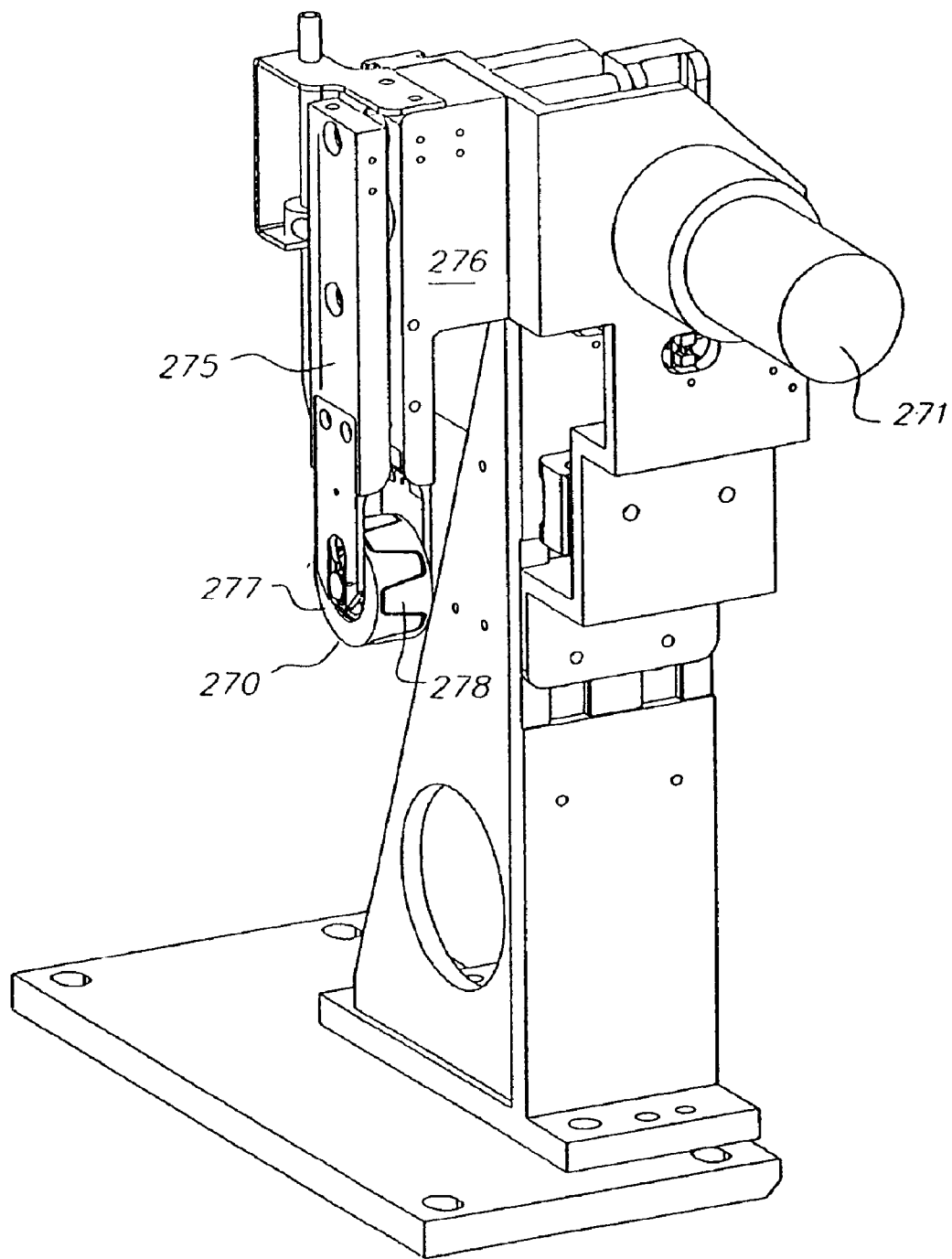

With reference to FIG. 7B as described above, motor 271 is adapted to provide motion to pistons or shafts 272 which move member 275 with respect to or relative to member 276. This provides corresponding movement to roller members 277, 278 to permit roller 270 to be expandable between a first width when members 277 and 278 overlap each other by a first amount as shown in FIG. 7C, and a second width larger than the first width, when members 277 and 278 move away from each other so as to overlap each other by a second amount less than the first amount or not at all as shown in FIG. 7B. The mechanism for placing roller 270 between the larger width state and the shorter width state could be any one of a variety of movement mechanisms such as gears, cams, belts, pneumatics or a combination thereof.

Figure 7D:
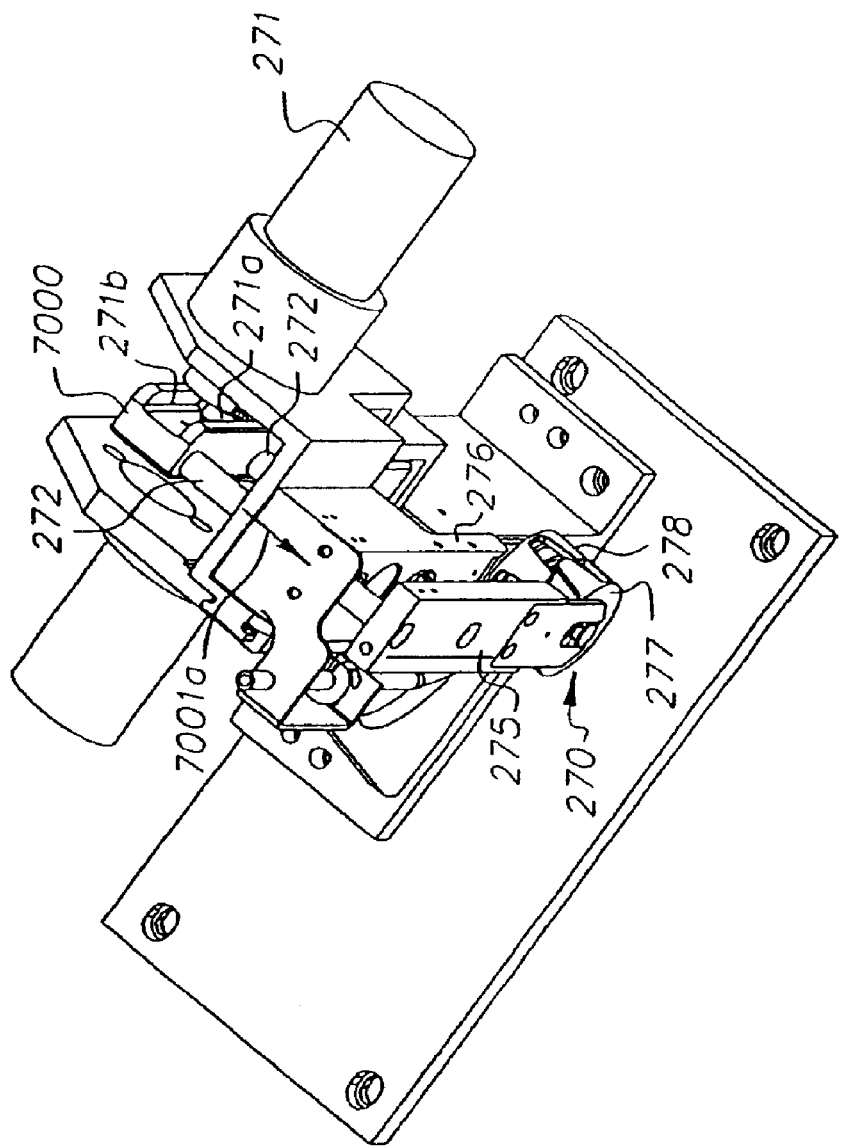
Figure 7E:
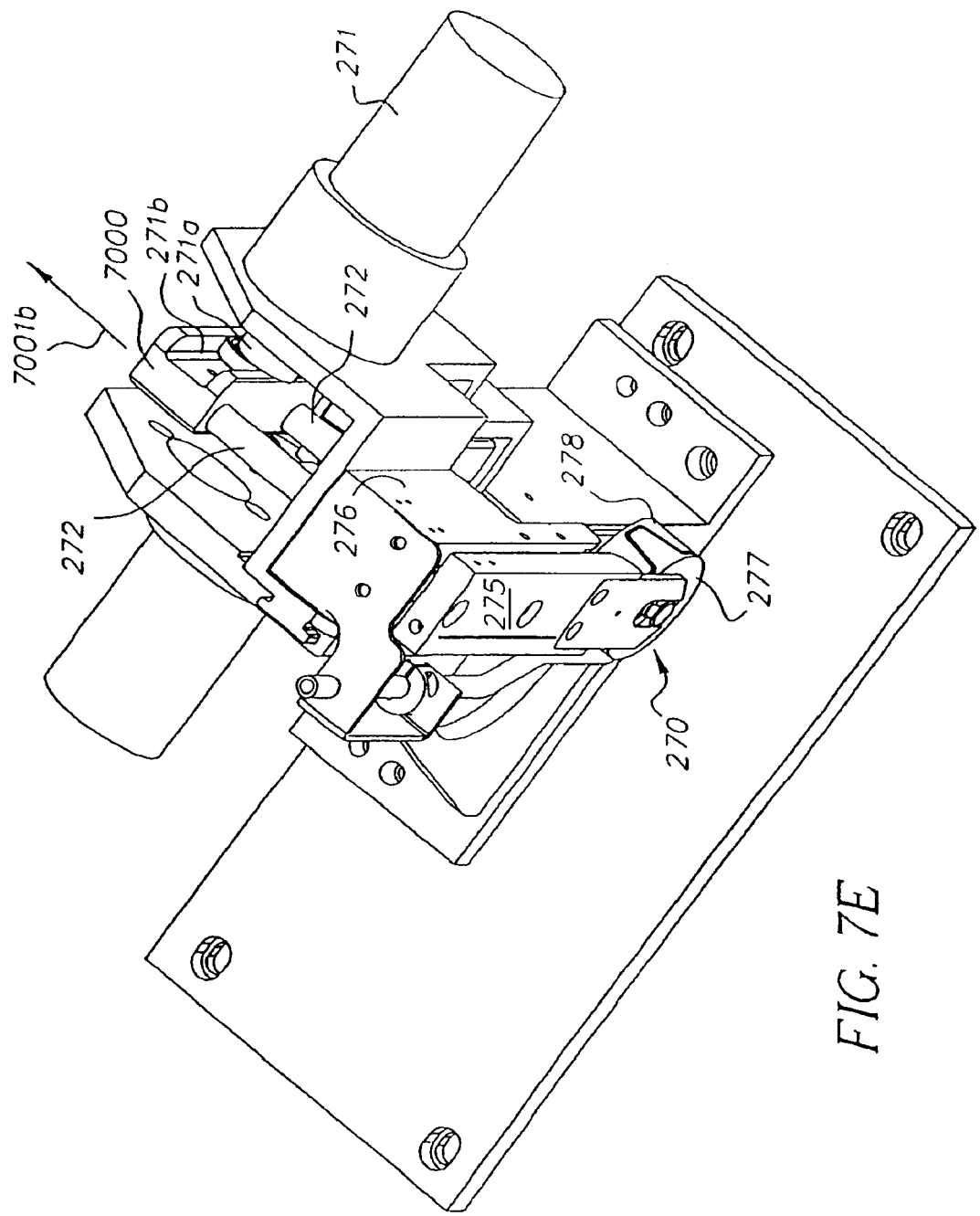

An example of a mechanism for placing roller 270 between the larger width state and the shorter width state is illustrated in FIGS. 7D and 7E. As shown in these drawings, motor 271 could be attached to an eccentrically mounted cam 271a which rotates about a center axis of motor 271 upon actuation of motor 271. Cam 271a is fitted within an opening 271b of a plate member 7000. Plate member 7000 is attached to at least pistons 272. Therefore, upon actuation of motor 271, cam 271a is moved so as to be located at a first position illustrated in FIG. 7D. This movement of cam 271a causes plate member 7000 to be moved in direction 7001a. Movement of plate member 7000 in direction 7001a causes a corresponding movement of pistons 272 in the same direction. This movement of pistons 272 causes member 275 to move away from member 276, which causes roller member 277 to move a corresponding amount relative to roller member 278 to provide for the wide width state of roller 270 as shown in FIGS. 7B and 7D.

When it is desired to place roller 270 in the shorter width state, motor 271 is actuated to rotate or locate cam 271a in the position shown in FIG. 7E. This causes a movement of plate member 7000 in an opposite direction (direction 7001b). Movement of plate member 7000 in direction 7001b causes a corresponding movement of pistons 272 in the same direction. This movement of pistons 272 causes a movement of member 275 in a direction toward member 276 which results in the movement of roller member 277 toward roller member 278 to provide for the shorter width state shown in FIGS. 7C and 7E.

The above description with respect to FIGS. 7D and 7E is only one example for moving roller members 277 and 278 to achieve the shorter and longer width states. It is realized that numerous types of moving mechanisms can be utilized to achieve the noted movement, and therefore, the present invention is not limited to the example shown. For example, motor 271 can drive pistons 272 via a gear drive, a screw gear, a belt drive, a pneumatic drive or a combination thereof.

Figure 7F:
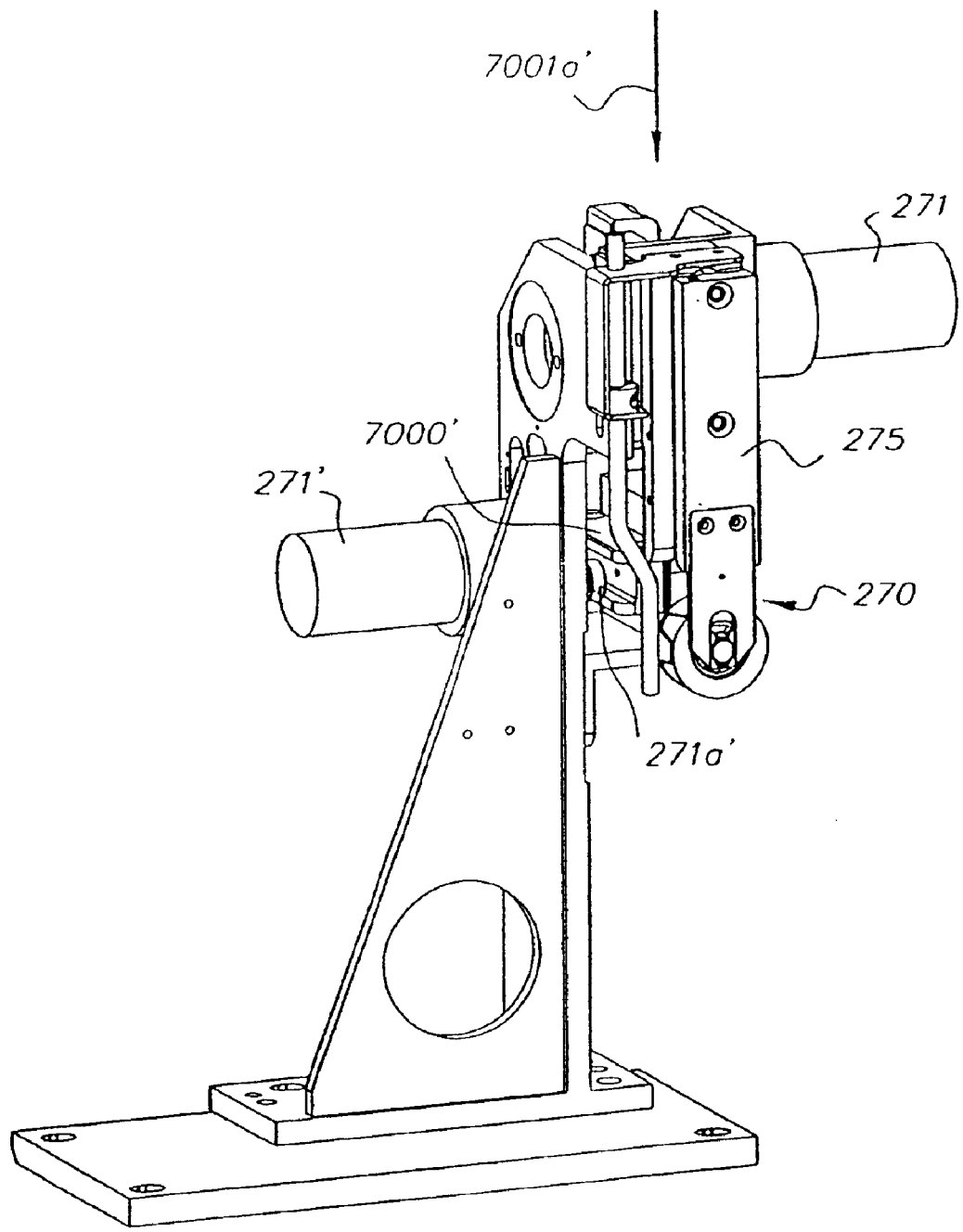
Figure 7G:
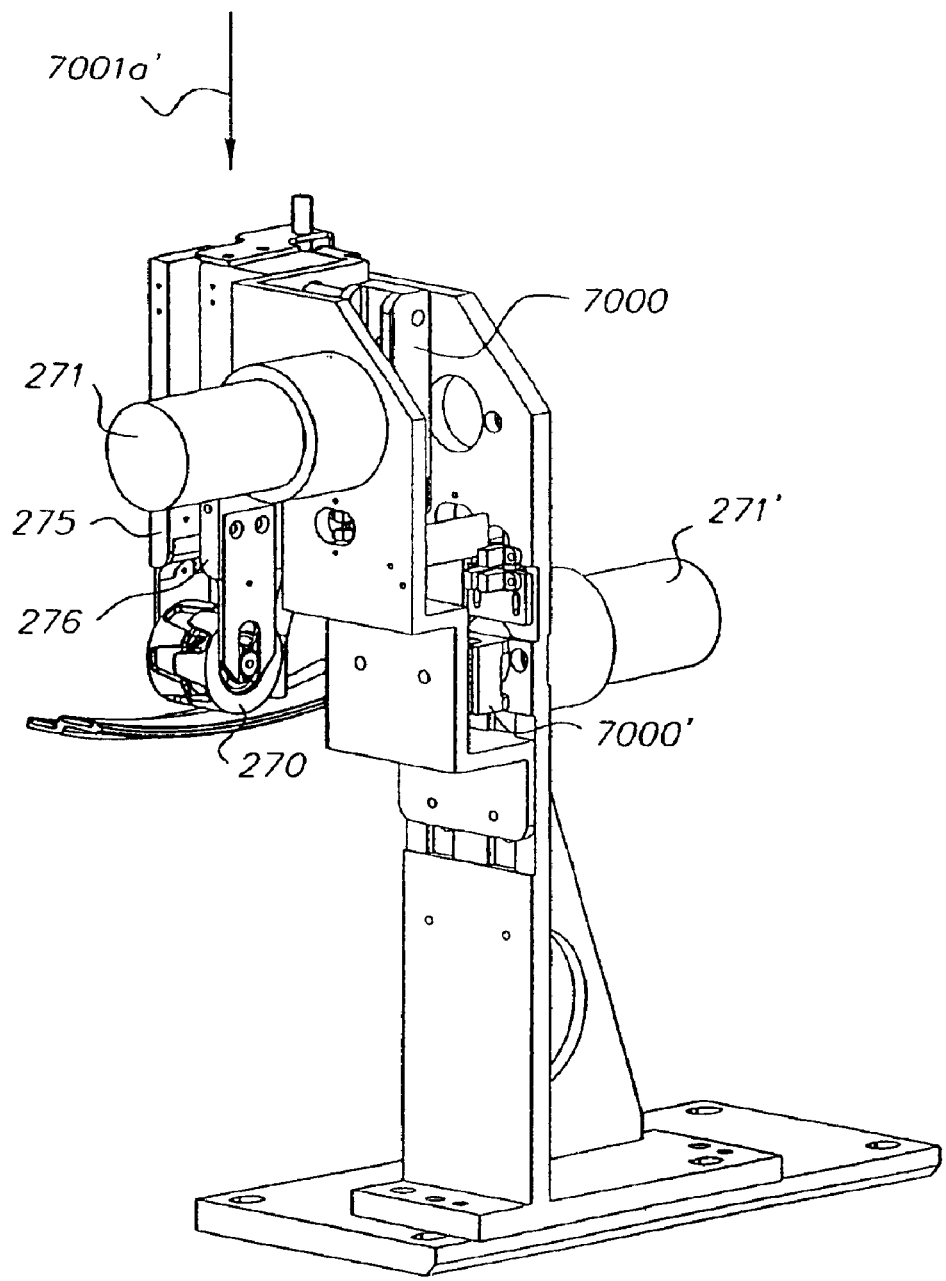
Figure 7H:
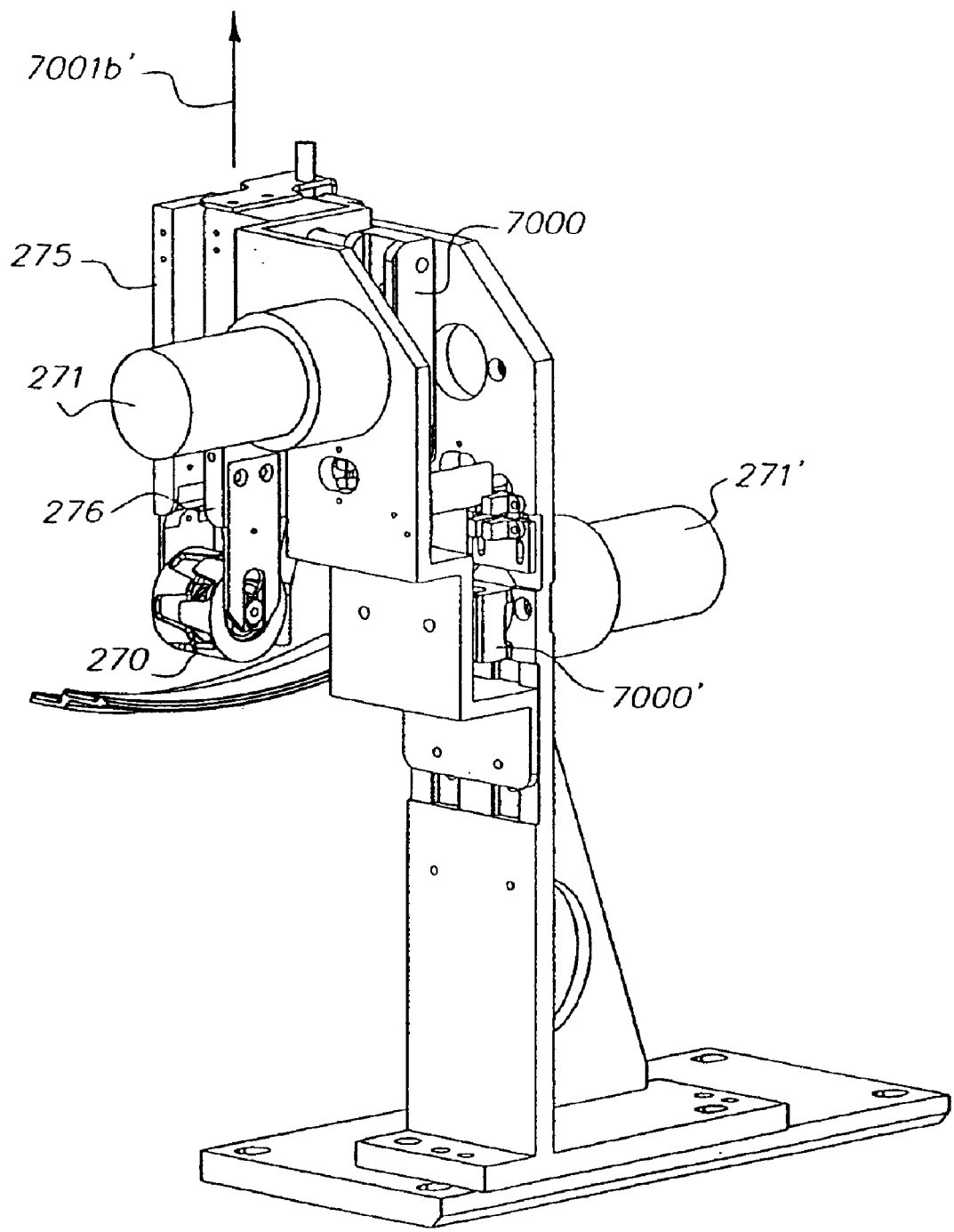

Further, as also shown in FIGS. 7F, 7G and 7H, roller 270 can be adapted to be moved up and down in response to, for example, the actuation of a motor to accommodate different films and different locations of the processing paths within the drum. The mechanism for moving roller 270 in a vertical direction could be any one of a variety of movement mechanism such as gears, cams, belts, pneumatics or a combination thereof.

FIGS. 7F, 7G and 7H illustrate one example for moving roller 270 vertically or up and down. As shown in FIG. 7F, a further motor 271' is attached to an eccentrically mounted cam 271a' which is adapted to rotate about a center axis of motor 271' upon rotation of motor 271'. Cam 271a' is fitted within a plate member 7000' in a manner similar to the arrangement of FIGS. 7D and 7E. Plate 7000' is attached to at least member 276 which is attached to member 275. As previously described, members 275 and 276 are respectively attached to roller members 277 and 278. Therefore, upon actuation of motor 271', cam 271a is located at a first position illustrated in FIG. 7F and FIG. 7G. This movement of cam 271a' causes plate member 7000' to move in direction 7001a' which causes a corresponding movement of members 276 and 275 and therefore roller 270 in direction 7001a'. This provides for the placement of roller 270 in the lower position as shown in FIG. 7F and FIG. 7G.

When it is desired to place roller 270 in an upper position, motor 271' is rotated to place cam 271a' in a second position. The movement of cam 271a' causes a movement of plate member 7000' in an opposite direction (direction 7001b') as shown in FIG. 7H. Movement of plate member 7000' in direction 7001b' causes a corresponding movement of members 275, 276 and therefore roller 270 in direction 7001b' to the position illustrated in FIG. 7H. This provides for the upper position of roller 270.

The above description with respect to FIGS. 7F, 7G and 7H is only one example for moving roller 270 up and down. It is realized that numerous types of moving mechanisms can be utilized to achieve the noted movements and therefore, the present invention is not limited to the example shown. For example, motor 271' can drive roller 270 via a gear drive, a screw gear, a belt drive, a pneumatic drive or a combination thereof.

Further, the above movements of roller 270 between a shorter width state and a longer width state, and between the upper position and the lower piston, can be achieved through the use of a single motor. That is, a single motor can be interengaged with a drive that places roller 270 in the shorter or longer width states while moving roller 270 to the upper or lower positions.

Figure 8:
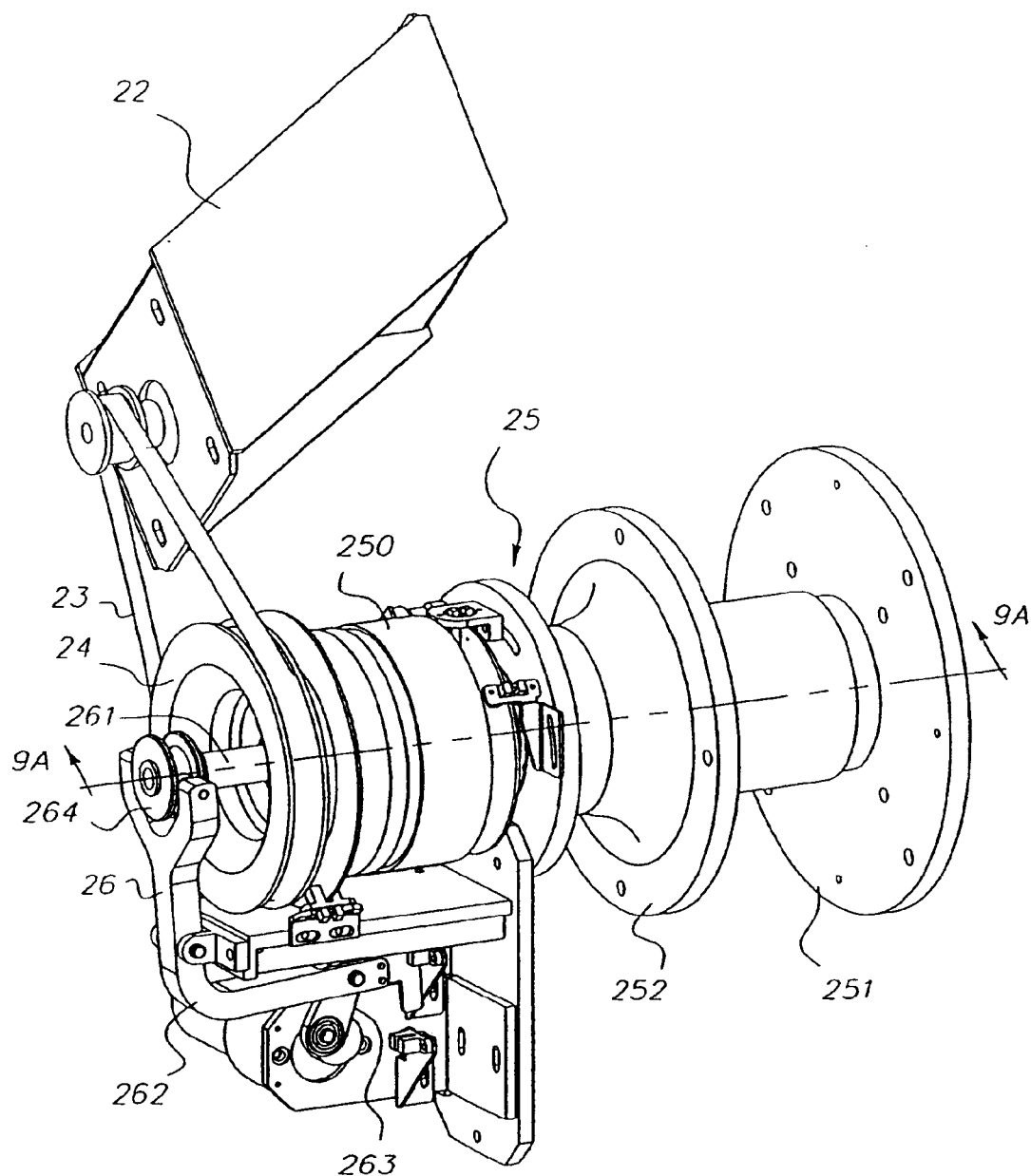
FIG. 8 depicts an exemplary drum and disk drive mechanism for rotating a circular processing drum, and a clutch mechanism for selectively engaging the drum and disk.
Figure 9A:
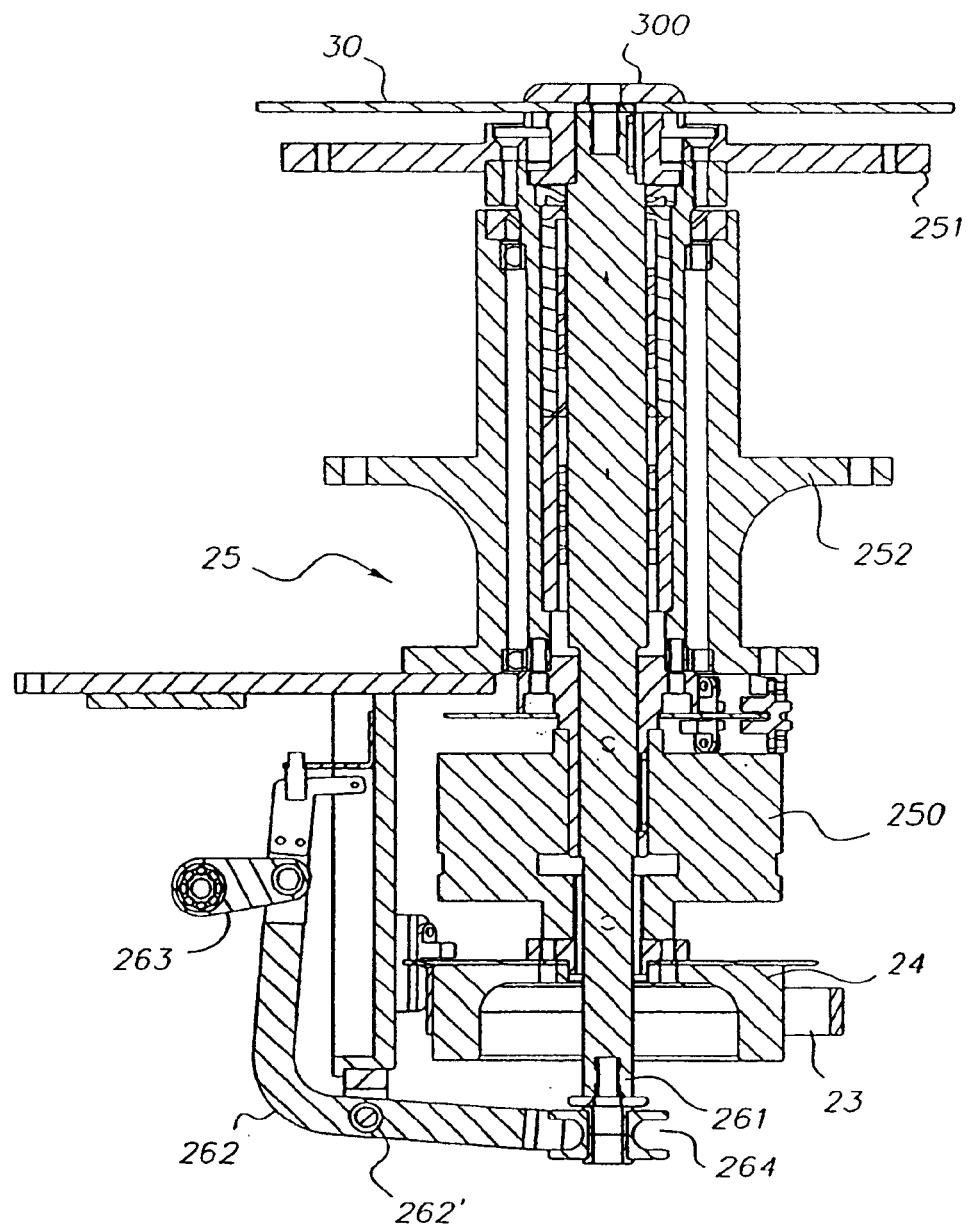
FIG. 9A displays a cross-sectional view of the drum and disk drive mechanism along line A—A in FIG. 8.

Circular processing drum 14 is connected to a drum and disk drive mechanism 25, which selectively rotates disk 30 relative to drum 14 to position and convey the film along and within processing drum 14, and rotates both disk 30 and drum 14 together during a processing and/or cleaning cycle. Circular processing drum 14 rotates about an axis of symmetry. An exemplary drum and disk drive mechanism 25 is shown in FIG. 8. Drum and disk drive mechanism 25 cooperates with a motor 22, a belt 23, and a pulley 24 as shown in FIGS. 8 and 9A. Drum and disk drive mechanism 25 includes a drive shaft 261 which is operationally connected to pulley 24. Also shown in FIGS. 8 and 9A are flanges 251 and 252. Flange 251 is connected to drum 14 while an end cap 300 holds disk 30 for rotation about drive shaft 261 (FIG. 9A). Actuation of motor 22 drives belt 23 which in turn drives pulley 24. This in turn causes a rotation of drive shaft 261 which rotates disk 30. Clutch mechanism 250 enables the engagement and disengagement of flange 251 to provide selective rotation to circular processing drum 14.

Figure 9B:
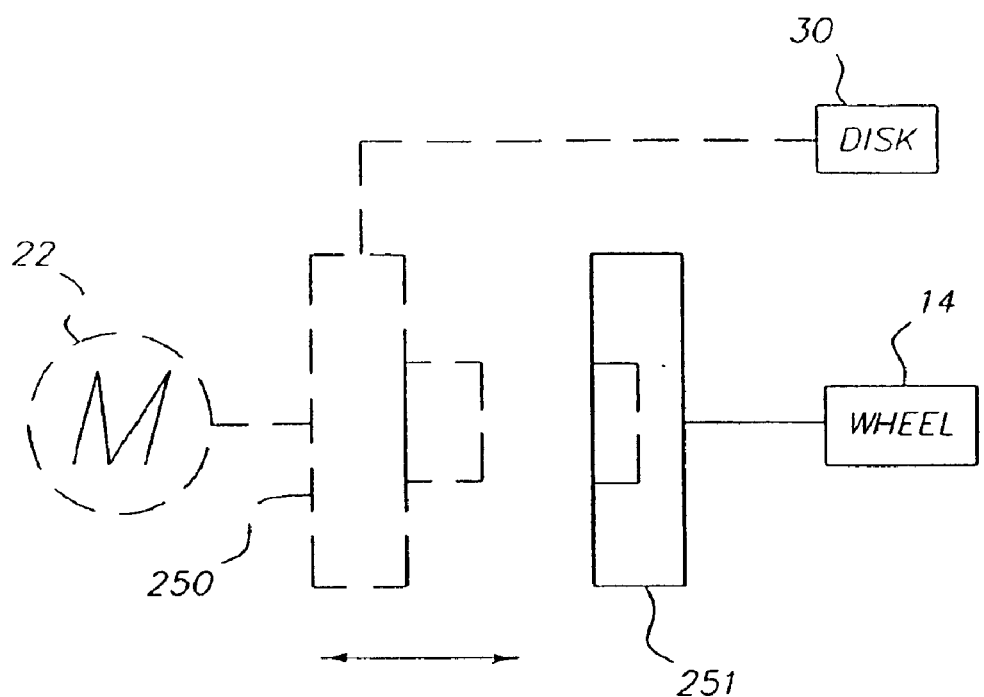
FIG. 9B schematically illustrates a driving and clutching arrangement of the invention.

FIG. 9A displays a cross-sectional view of drum and disk drive mechanism 25 and clutch mechanism 250 along line 9A—9A in FIG. 8. With reference to FIG. 9A and FIG. 9B which is a schematic representation of the driving and clutching feature of the present invention, an operation will now be described. When loading film which will be described with reference to FIGS. 10 and 11, clutch 250 is deactivated as shown in FIG. 9B. In this state, rotation of motor 22 will cause a rotation of drive shaft 261 and accordingly, a rotation of disk 30 relative to drum 14. This is due to the fact that clutch 250 is deactivated and therefore, drum 14 is not rotated. This permits the conveyance of the film by rotation of disk 30 to a desired location within drum 14. After the film reaches the desired location within drum 14, clutch 250 is activated, (for example, clutch 250 is moved to the right in FIG. 9B) by actuating clutch 250 with flange 251 which is attached to drum 14. Therefore, a rotation of motor 22 will cause a rotation of both disk 30 and drum 14. This occurs during the processing stages to process the film in a manner which will be described later, and also during a cleaning stage.

Drive shaft 261 can be moved perpendicularly and through flange 251 and flange 252 to move disk 30 attached thereto. As shown in FIG. 9A, drive shaft 261 is attached to a fitting 264 in a manner which permits drive shaft 261 to rotate relative to fitting 264. Fitting 264 is in turn rotatably attached to a pivotable arm 262 and a movable member 263. Movable member 263 can be operationally connected to a motor for rotation of member 263. This causes arm 262 to pivot about point 262' to move drive shaft 261 to the left or right when viewing FIG. 9A from above the page. Movement of drive shaft 261 as noted above, moves disk 30 in a direction parallel to an axis of disk 30. This facilitates the accommodation of, for example, 35 mm and APS film on disk 30, since the disk 30 can be moved based on the type of film being processed.

Figure 10:
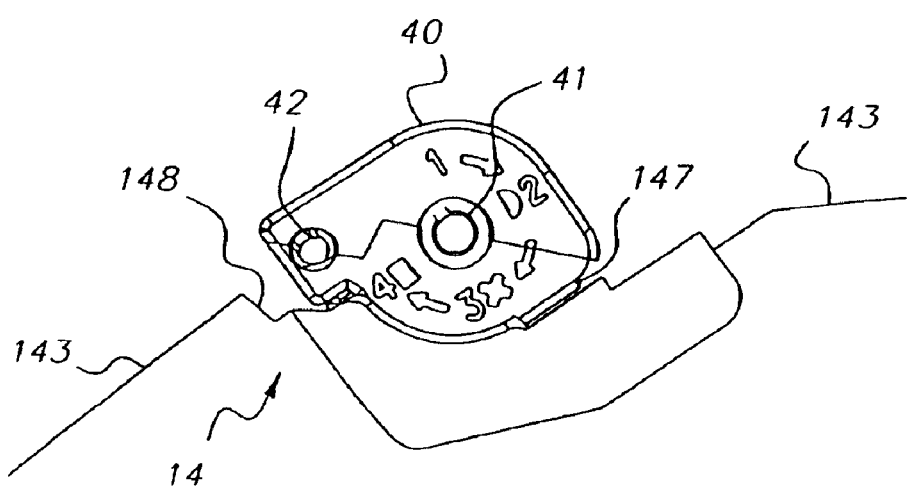
FIG. 10 depicts a film cartridge in a film-loading position using one film-loading method of the present invention.

Within the context of the present invention, a film may be loaded into circular processing drum 14 by a number of methods. One method of loading film, such as APS film, into circular processing drum 14 is shown in FIGS. 10–13. As shown in FIG. 10, film cartridge 40 comprising a film cartridge spool 41 and film cartridge door opening mechanism 52 is positioned in a film cartridge loading area 147 located on side wall 143 of circular processing drum 14. Film (not shown) exiting film cartridge 40 enters circular processing drum 14 at light tight film input slot 148 (FIG. 3) in side wall 143 of circular processing drum 14.

Figure 11:
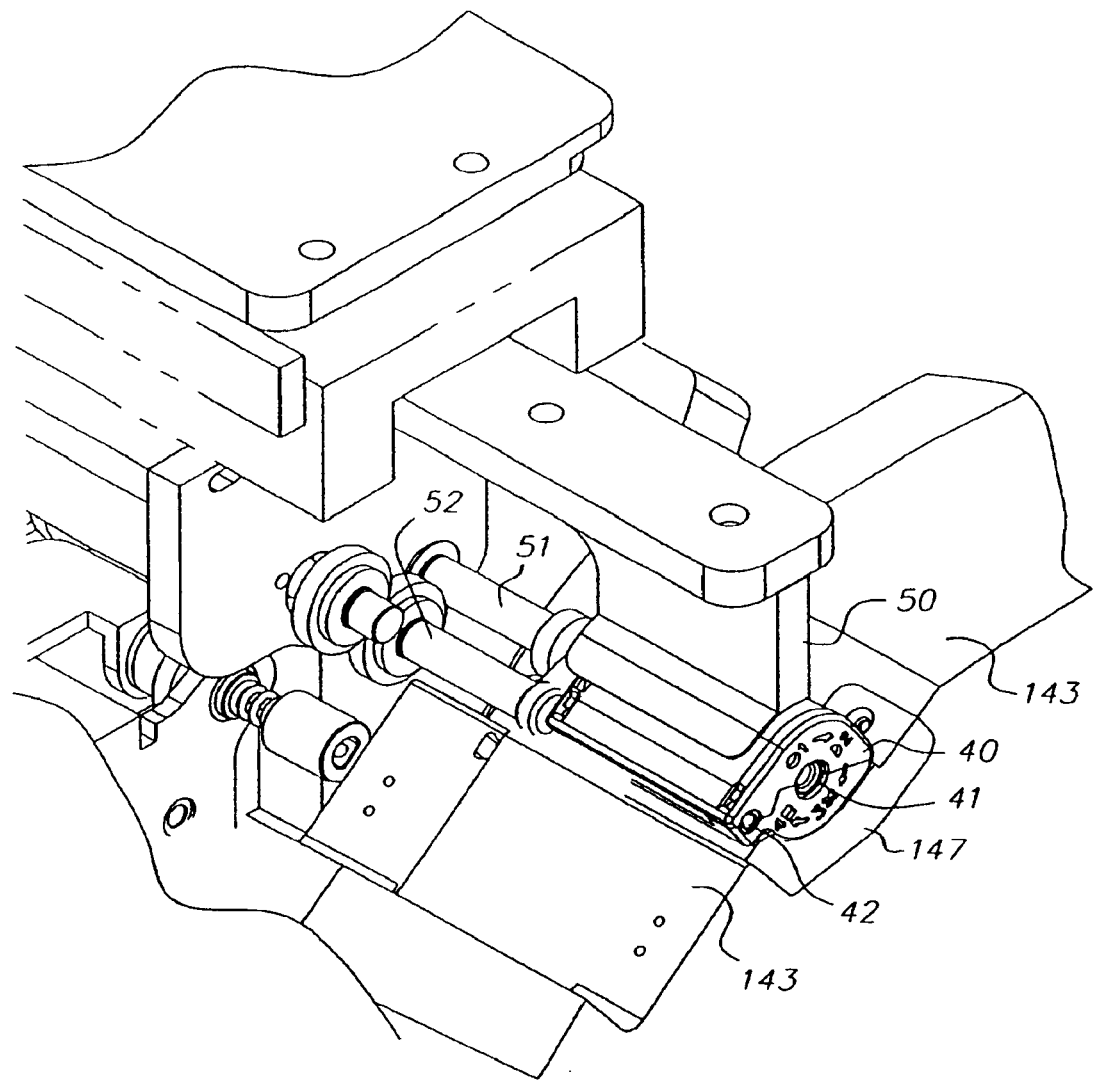
FIG. 11 depicts a film cartridge stabilizing step in one film-loading method of the present invention.

Once film cartridge 40 is positioned in film cartridge loading area 147, photographic processor 10 can initiate a number of film-loading and conveying steps, the results of which are shown in FIG. 11. It is noted that the film loading and conveying steps as well as other processing steps can be controlled by a computer or central processing unit (CPU) 2000 (FIG. 1) operationally associated with processor 10. In a first step, a film cartridge stabilizing member 50 applies an amount of pressure onto an upper surface of film cartridge 40 to prevent film cartridge 40 from moving while positioned in film cartridge loading area 147. Spool engaging member 51 and cartridge door opening mechanism engaging member 52 move toward film cartridge 40 and engage with film cartridge spool 41 and film cartridge door 42, respectively. Door opening mechanism engaging member 52 opens film cartridge mechanism 42 and spool engaging member 51 begins to rotate film cartridge spool 41, forcing film (not shown) out of film cartridge 40.

Figure 12:
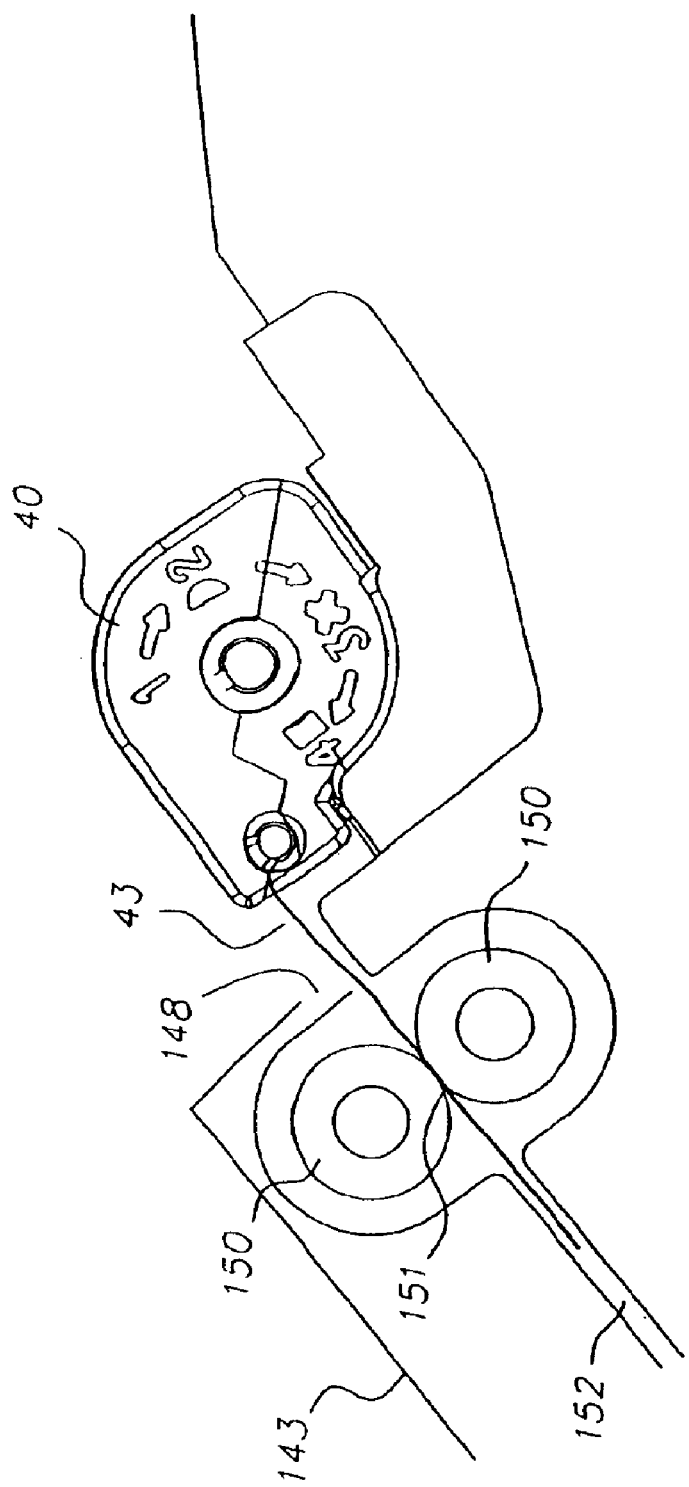
FIG. 12 depicts a film nipping step during a film-loading method of the present invention.
Figure 13:
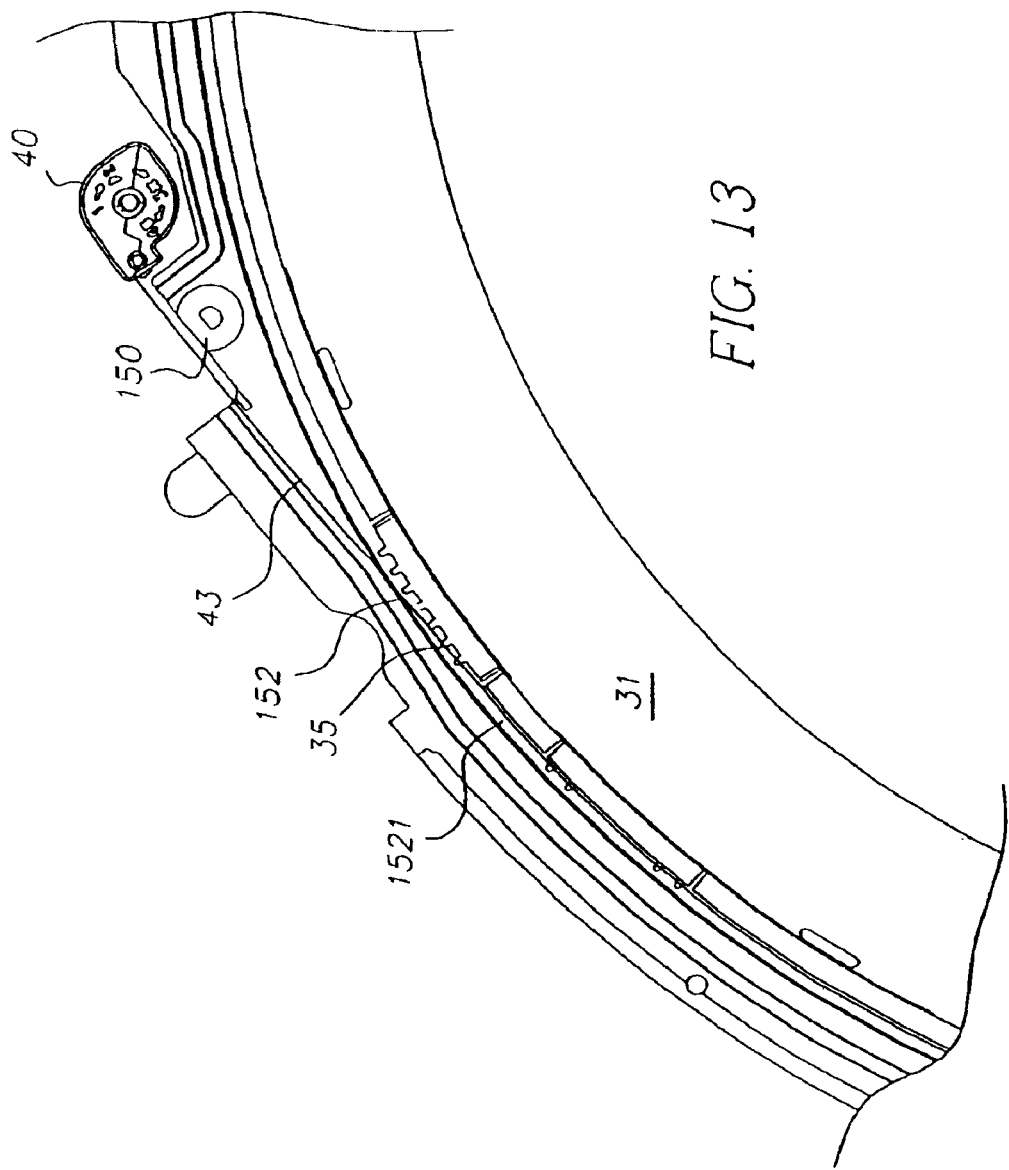
FIG. 13 depicts a cross-sectional view of film entering into a circular processing drum in one film-loading method of the present invention.

FIG. 12 shows a strip of film 43 exiting film cartridge 40 and entering film input slot 148 of circular processing drum 14. Driven nip rollers 150 grasp a leading edge of the strip of film 43 at drum roller nip point 151 and advance film 43 further into circular processing drum 14. As shown in FIG. 13, the strip of film 43 exits drum cavity slot 152 and enters into the drum processing cavity 1521 of circular processing drum 14, wherein one or more sets of disk teeth 35 on disk 30 interengage with holes or perforations along an edge of the strip of film 43. As previously described, disk teeth 35 could be spring loaded so as to spring up at the appropriate time and interengage with the holes or perforations along film 43. With clutch 250 disengaged, disk 30 and rollers 150 are rotated while circular processing drum 14 remains stationary. This causes film 43 to advance into the processing cavity 1521 of circular processing drum 14 a desired distance equal to the length of the strip or roll of film 43. As shown in FIGS. 10–13, in this film-loading method the film 43 remains intact with film cartridge 40.

A number of commercially available films may be loaded according to the film-loading method described above, namely, wherein the film remains intact with its corresponding film cartridge during processing. A suitable film, which may be used in this particular film-loading method, includes, but is not limited to, APS film. Desirably, APS film is loaded into the photographic processor of the present invention according to this method.

Figure 14:
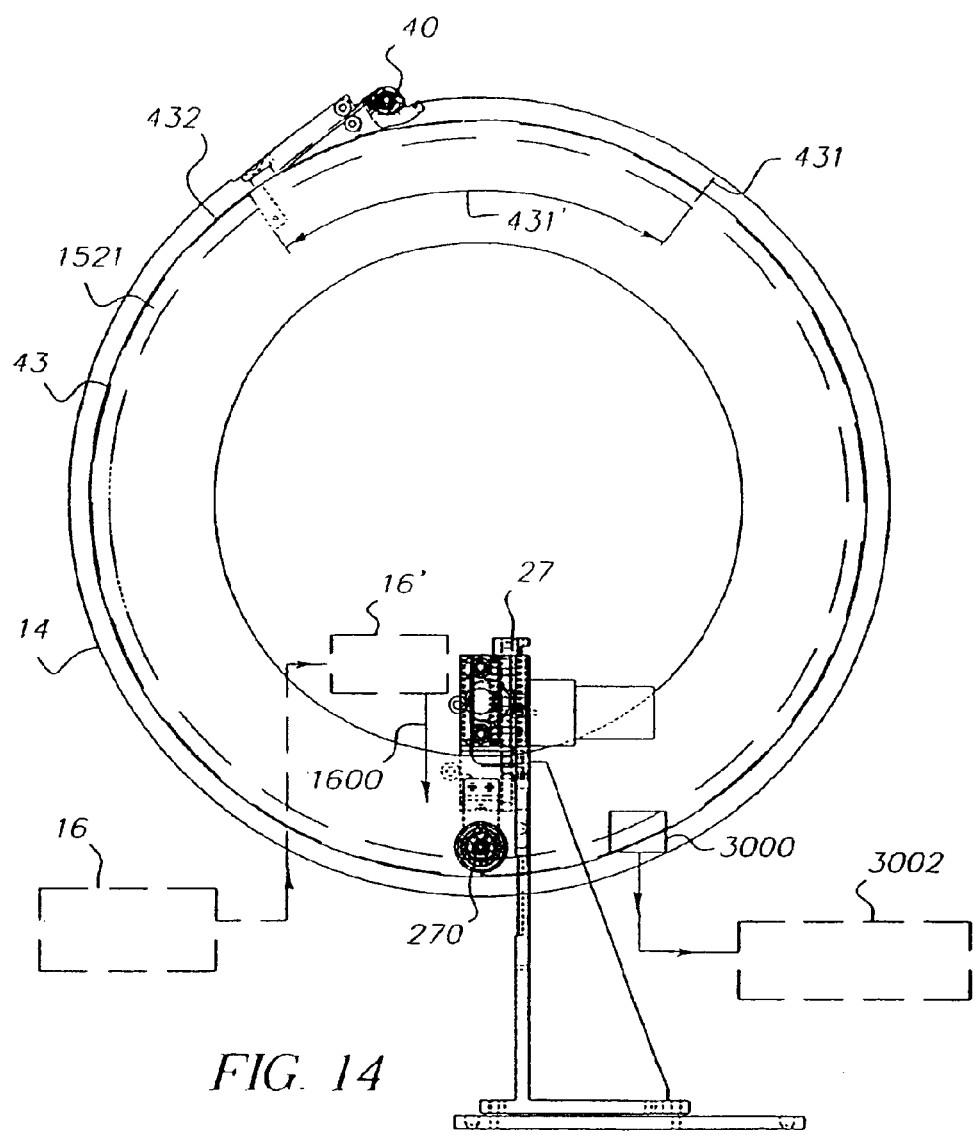
FIG. 14 depicts a sheet of film having a lead end and a tail end within the drum processing cavity of a circular processing drum.

FIG. 14 depicts circular processing drum 14 fully loaded with film 43 having a forward end 431 and a rearward end 432 within the drum processing cavity 1521 of circular processing drum 14. The back end of film 43 is maintained in cartridge 40. Film 43 is now positioned within circular processing drum 14 for chemical processing, wherein one or more processing fluids are deposited into circular processing drum 14 and placed in contact with film 43 for a desired period of time.

It is noted that the circumference of the drum will be longer than the length of the film to be processed. Therefore, when the film is loaded in drum 14, a section of drum 14 will not have film therein. This is referred to as a film-free zone 431' (FIG. 14). Prior to delivering chemistry by way of chemical supply 16 and a chemical delivery mechanism 16' (FIG. 14), clutch 250 is activated or engaged and drum 14 is controllably rotated with disk 30 so that film-free zone 431' is at a lower end or below chemical delivery mechanism 16'. Chemical delivery mechanism 16' is preferably of the type which drops or delivers chemistry into drum 14 in the direction of arrow 1600 (FIG. 14). The movement of film-free zone to an area below chemical delivery mechanism 16' prior to the delivery of chemicals prevents the chemicals from being dropped directly on the film which could cause uneven processing. Thereafter, processing occurs by continuously rotating the drum 14 and disk 30. Further, as shown in FIG. 14, in the lower portion of drum 14, film 43 passes between wheel 270 and an inner surface of drum 14. Rotation of drum 14 and disk 30 relative to wheel 270 helps to agitate the processing fluid in the vicinity of wheel 270 to promote processing. Drum 14 can be selectively rotated in a continuous or intermittent manner. Following the chemical processing steps, the film 43 is removed from circular processing drum 14 and exposed to a drying operation. One method of removing film 43 from circular processing drum 14 is shown in FIGS. 15A and 15B.

As shown in FIG. 15A, film transfer arm assembly 60 is positioned to move or pivot between circular processing drum 14 and dryer 17. Film transfer arm assembly 60 includes a lower arm member 61, which is rotatable around an axis of symmetry 153 of circular processing drum 14. Film transfer arm assembly 60 also includes an upper arm member 62, which is pivotally attached to lower arm member 61. At upper arm member end 63, film transfer arm assembly 60 includes a film cartridge gripper 64 and film strip gripper rolls 65. As shown in FIG. 15B, which is a front view of the entrance of dryer 17, a side wall of dryer 17 includes a slot 1700 with a rubber seal that extends along the length of the dryer. Upper arm member 62 includes a shaft 620 which extends from upper arm member 62, through slot 1700 and is connected to gripper 64. This permits transfer arm assembly 60 to pull gripper 64 and thus the film to be dried though the dryer.

In embodiments wherein the film 43 remains intact with film cartridge 40 (as described above), film cartridge gripper 64 of film transfer arm assembly 60 engages with film cartridge 40, pulls film cartridge 40 from loading area 147 and the strip of film 43 from circular processing drum 14 in direction 600a, and proceeds through dryer 17 in direction 600b. Therefore, cartridge 40 with processed film 43 attached and trailing therefrom is conveyed through dryer 17 to dry film 43 by, for example, the blowing of air into dryer or drying cylinder 17. In other embodiments where the film 43 is detached from film cartridge 40 (described below), film sheet gripper rolls 65 grip an edge of film 43 as film 43 exits film input slot 148 of circular processing drum 14. Film sheet gripper rolls 65 of film transfer arm assembly 60 pull film 43 from circular processing drum 14 and proceeds through dryer 17. Once dried, film 43 is rewound back into its cartridge 40 prior to proceeding to scanner 18'.

Figure 16:
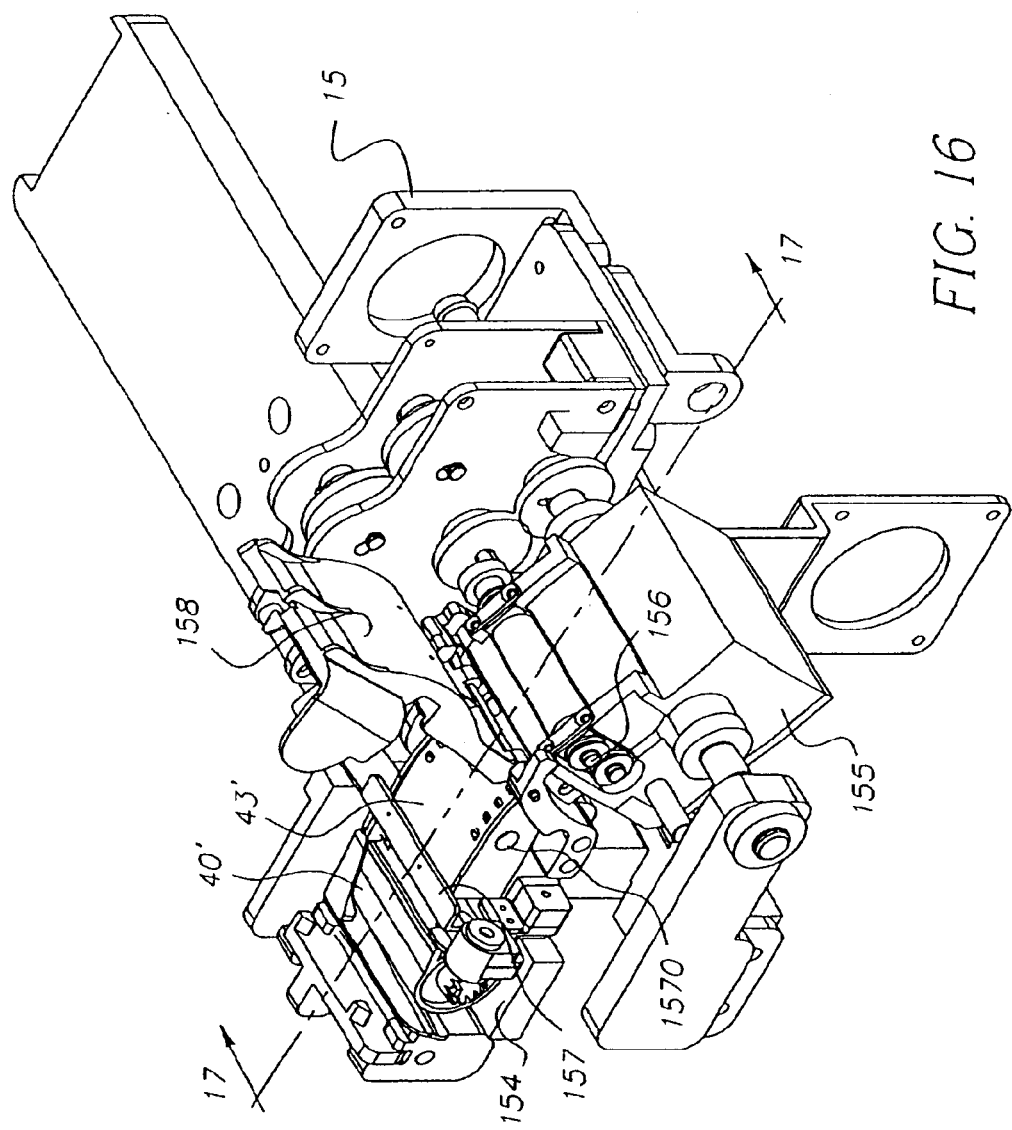
FIG. 16 depicts an exemplary film loading/unloading device used in a film-loading method of the present invention wherein film is separated from its corresponding film cartridge.

In a further film-loading method, the film is separated from its film cartridge prior to processing within circular processing drum 14 (for example, 35 mm film). In this method, a film loading/unloading device, such as exemplary film loading/unloading device 15 as shown in FIG. 16, may be used. Film loading/unloading device 15 includes a film cartridge loading area 154, which can be enclosed by closing a door 158. In film loading area 154, an operator extracts the tongue of film 43' from cartridge 40' and engages the perforations on film 43' with sprockets on a driven roller 1570. Thereafter door 158 is closed and film 43' proceeds into a casing or festoon box 155 through festoon box nip rollers 156. Once a desired length of film is removed from film cartridge 40', a cutter 157 slices film 43' to separate film 43' from film cartridge 40'. Any counter device (not shown) may be used to measure the length of the strip of film 43' passing through festoon box nip rollers 156. The length measurement is used in further processing steps as described below.

Figure 17:
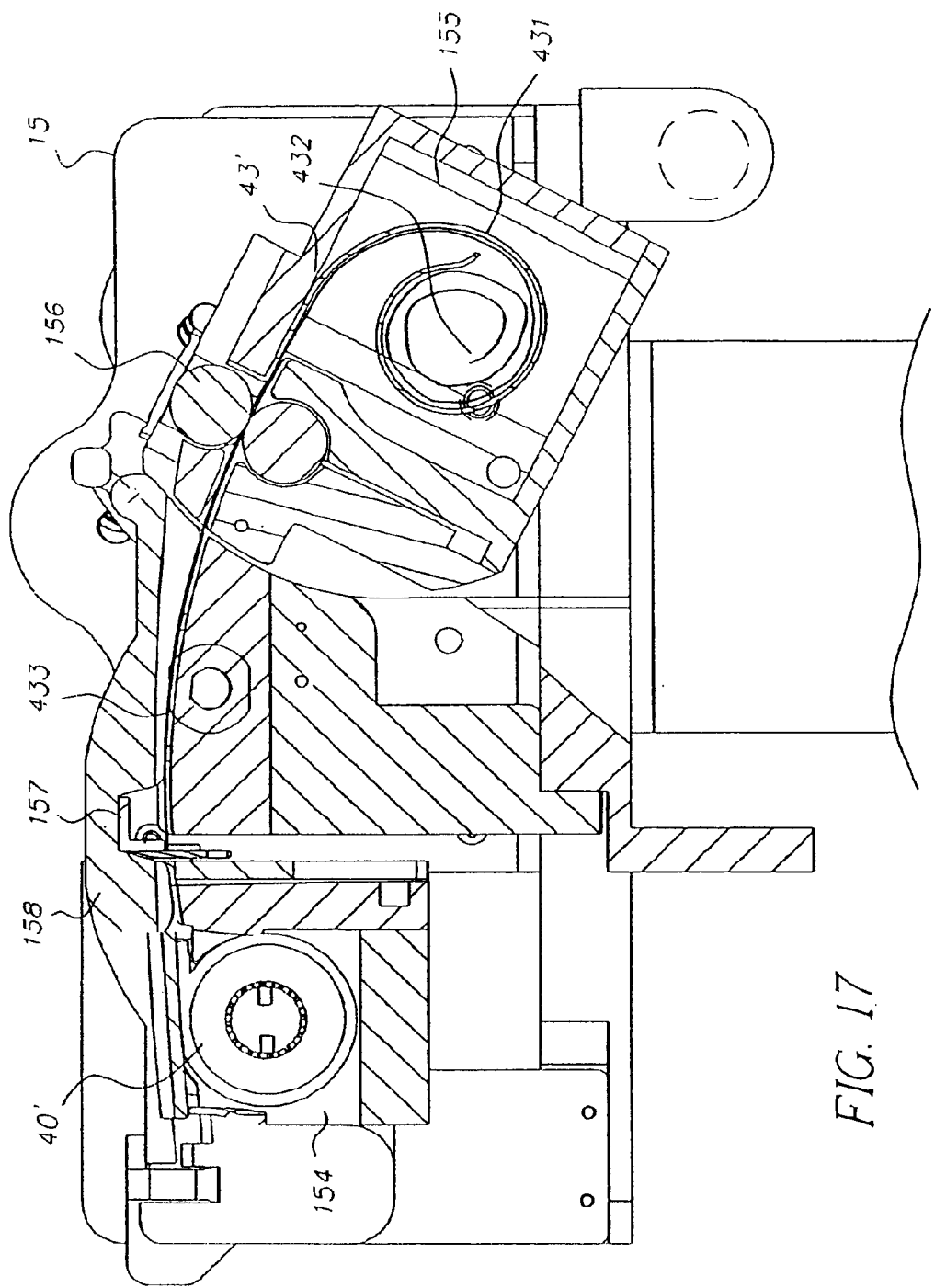
FIG. 17 depicts a cross-sectional view of the exemplary film loading/unloading device as seen along line B—B in FIG. 16.

FIG. 17 depicts a cross-sectional view of film loading/unloading device 15 as seen along line 17—17 in FIG. 16. As shown in FIG. 17, film cartridge 40' is positioned in film cartridge loading area 154 while a strip of film 43' is removed from film cartridge 40' and transported to festoon box 155 where it is turned. In this film-loading operation, a reverse roll of film 431 is formed from the film 43' in festoon box 155. A lead end of film 432 becomes the innermost portion of the reverse roll 431 while a tail end of film 433 becomes the outermost portion of reversed roll 431. When the film 43' is subsequently fed into circular processing drum 14 (as previously described), tail end 433, which contains the last exposures on the strip of film 43', is fed into circular processing drum 14 first.

Figure 18:
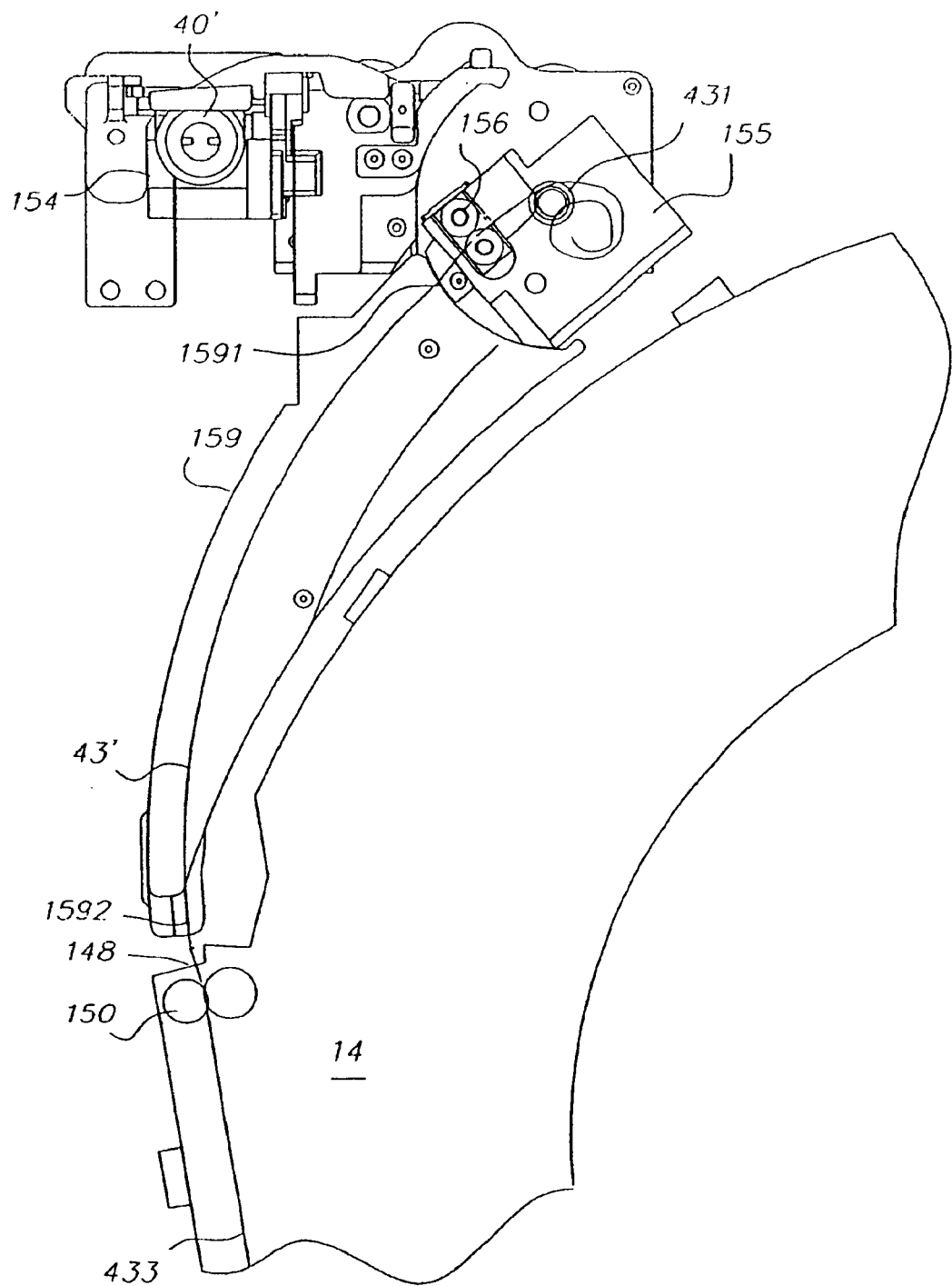
FIG. 18 depicts an exemplary film-loading guide used to load a film roll into a circular processing drum.

A film-loading guide 159 is used to load reverse roll 431 into circular processing drum 14 as shown in FIG. 18. Festoon box 155 rotates from an initial position (as shown in FIGS. 16 and 17) to a film-loading position as shown in FIG. 18. Festoon box nip rollers 156 turn to advance tail end 433 of reverse roll 431 into film-loading guide 159 at guide entrance slot 1591. The film 43' exits the film-loading guide 159 at guide exit slot 1592 positioned adjacent to film input slot 148 of circular processing drum 14. Once the tail end 433 of the strip of film 43' enters into circular processing drum 14, driven nip rollers 150 grab the film 43' and advance the film 43' into circular processing drum 14 as described above. It should be noted that in this film-loading method, nip rollers 150 are programmed to advance the film 43' into circular processing drum 14 a specific length, which corresponds to the length of film inputted into festoon box 155 and measured via festoon box nip rollers 156 as described above. In other words, nip rollers 150 advance the strip of film 43' into circular processing drum 14 so that lead end 432 of film 43' remains nipped between nip rollers 150 during chemical processing (i.e., lead end 432 of the strip of film 43' does not enter into drum processing cavity 1521). This permits all of the exposed areas of the film 43' to be in the processing area in the drum.

Figure 19:
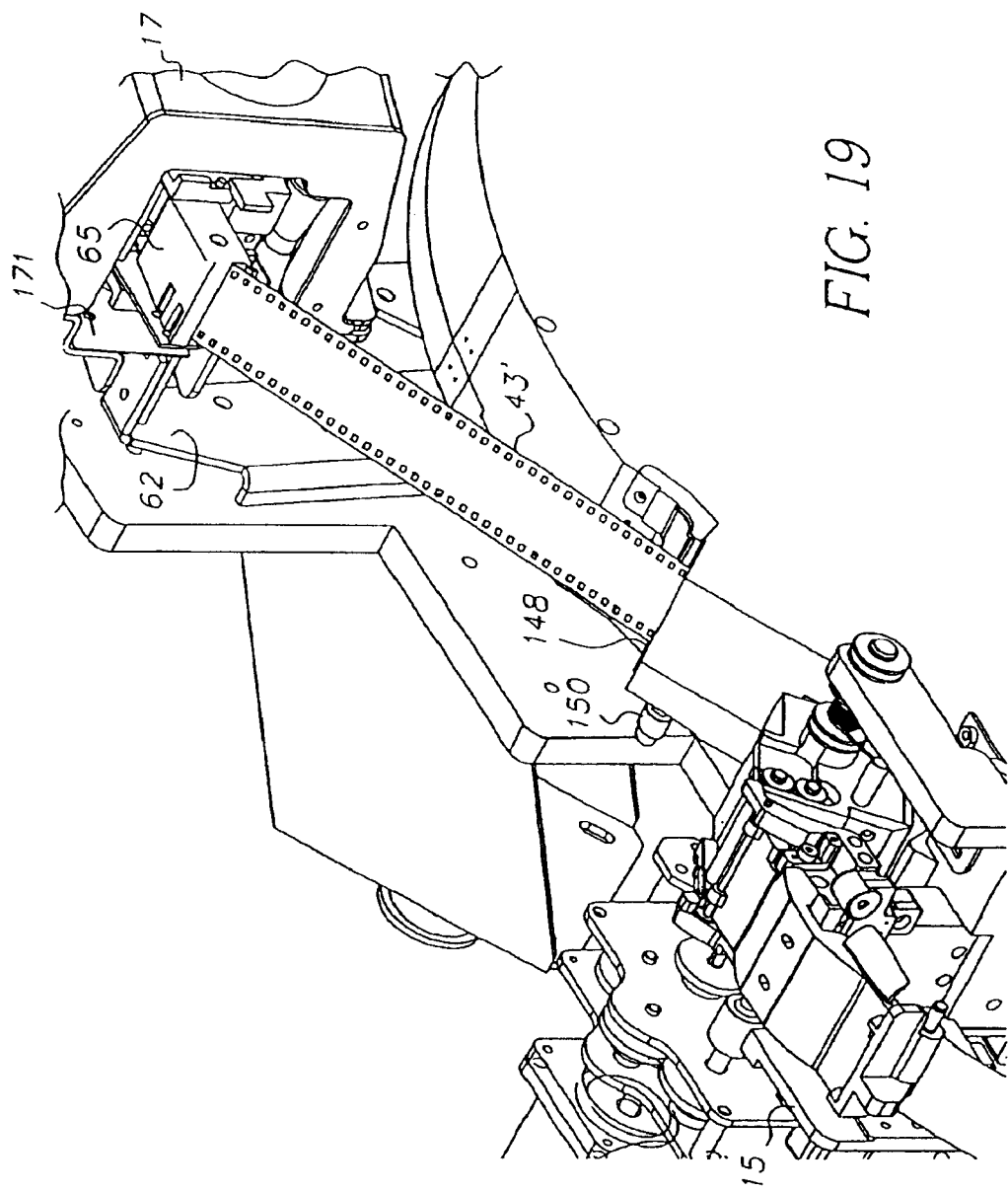
FIG. 19 depicts a film transfer step, wherein a strip of film is transferred from a circular processing drum to a dryer by film sheet gripper rolls attached to a film transfer arm.
Figure 20:
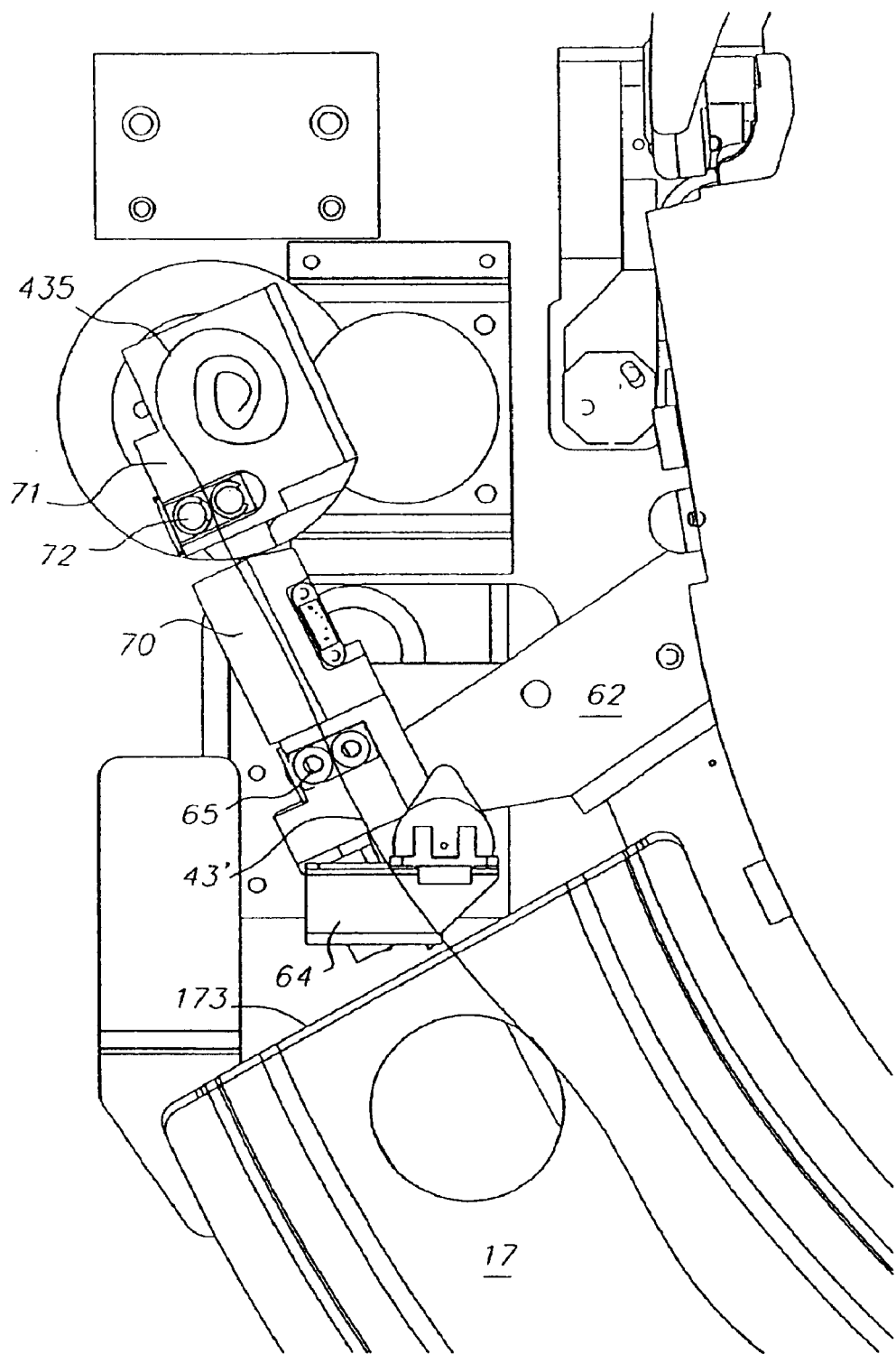
FIG. 20 depicts a film processing step, wherein a strip of film exits a dryer into a scanner festoon box.

Following the chemical processing steps, film 43' is transferred to dryer 17 by film transfer arm assembly 60 as described above. As shown in FIG. 19, the strip of film 43' is pulled from circular processing drum 14 through film input slot 148 by film sheet gripper rolls 65 attached to upper transfer arm member 62. Nip rollers 150 provide a first end (corresponding to lead end 432) to film sheet gripper rolls 65. In FIG. 19, film sheet gripper rolls 65 are shown positioned at dryer entrance 171. From this position, film sheet gripper rolls 65 proceed through dryer 17 pulling the film 43' through dryer 17. As shown in FIG. 20, upper film transfer arm member 62 exits dryer 17 at dryer exit 173 and comes into contact with a conduit 70. Film sheet gripper rolls 65 turn to advance the film 43' through conduit 70 and into scanner casing or festoon box 71. Scanner festoon box nip rollers 72 grasp a leading edge of film 43' and force film 43' into scanner festoon box 71 forming scanner film roll 435. Scanner festoon box nip rollers 72 advance film 43' into scanner festoon box 71 a specific distance equal to the predetermined length of film 43' so that the tail end of film 43' remains nipped between scanner festoon box nip rollers 72 to go to the scanner.

Figure 21:
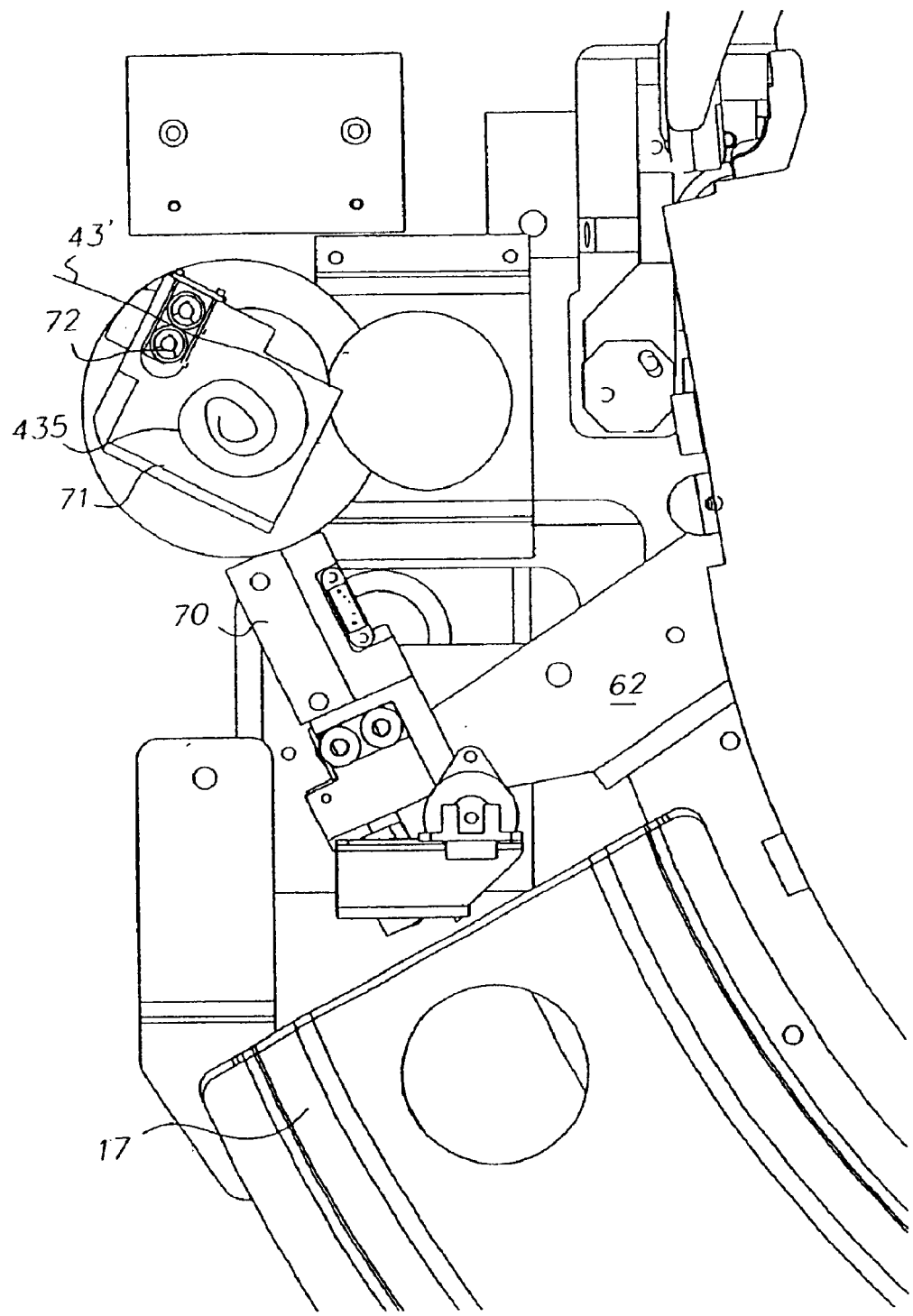
FIG. 21 depicts a film processing step, wherein a strip of film exits a festoon box and proceeds to a scanner.

In one embodiment, film 43' may be further processed by transporting the film 43' to scanner 18'. As shown in FIG. 21, scanner festoon box 71 rotates from an initial position (as shown in FIG. 20) to a secondary position so that the film 43' may be fed to scanner 18'. Scanner 18' may supply image data to computer 2000 or a remote computer (not shown) for further image processing. Following scanning, the film 43' may be packaged as a film roll or as strips of film and returned to the customer along with scanned photographs in electronic format on an electronic disc if desired.

A number of commercially available films may be loaded according to the film-loading method described above, namely, wherein the film is separated from its corresponding film cartridge during processing. Suitable films, which may be used in this particular film-loading method, include, but are not limited to, 135 mm film. Desirably, 135 mm film is loaded into the photographic processor of the present invention according to this method.

The photographic processor as described may be used to process one or more types of film. Suitable films include, but are not limited to, APS film, 135 mm film, etc. Desirably, the photographic processor is designed to process APS film, 135 mm film, or both APS and 135 mm film. However, the invention is not limited to APS and 135 mm film and it is recognized that other types of film such as 120 format and 110 format can also be processed in the processor of the present invention. The photographic processor may be categorized as a "single-roll", "single use" or "batch" processor given that the circular processing drum only chemically processes one roll of film at a time.

The photographic processor as described may include other components other than those described in FIGS. 1–21. For example, the photographic processor may include an operator interface control panel operationally associated with computer 2000 (FIG. 1); a display screen; a control unit, wherein the control unit accepts input from a processor user, provides machine settings to one or more components of the processor based on the input of the user, and controls and executes a processing operation of the processor; and multiple film loading doors on an outer surface of the photographic processor housing. In one desired embodiment, the photographic processor is used to process APS film and 135 mm film. In this embodiment, the photographic processor has two separate film loading doors on an outer surface of the photographic processor housing, one for an APS film cartridge and the other for a 135 mm film cartridge.

The photographic processor as described may use any conventional chemical delivery system known in the art as long as the chemical delivery system is capable of inputting one or more processing fluids into the circular processing drum. Suitable chemical delivery systems deliver one or more processing fluids including, but not limited to, a developing solution, a bleach solution, a fix solution, a wash solution, a combination or a concentrate thereof. Desirably, the chemical delivery system comprises one or more separate containers for each of the processing fluids. For example, the chemical delivery system may comprise one or more separate containers containing a developing solution, one or more separate containers containing a bleach solution, one or more separate containers containing a fix solution, and one or more separate containers containing a wash solution. In one embodiment of the present invention, the chemical delivery system used in the photographic processor comprises one container of developing solution, one container of bleach solution, one container of fix solution, and at least one container of wash solution.

Desirably, the photographic processor of the present invention utilizes a chemical delivery system comprising "working strength" chemical solutions. As used herein, the term "working strength" is used to describe chemical solutions, which are prepackaged in separate containers at concentrations that do not require dilution with other solutions (i.e., a source of water), and can be used as is. The system can very easily work with concentrates that are measured, diluted and heated on board. They can be diluted with water (if a supply is available) or with a simple rinsing solution that contains water and a surfactant.

Further, the photographic processor as described may use any conventional chemical removal system to remove or discard one or more processing fluids from the circular processing drum. Suitable chemical removal systems include, but are not limited to, a suction device or a drain 3000 (FIG. 14) in the side wall of the circular processing drum. Typically, the chemical removal system further comprises a chemical waste reservoir 3002 (FIG. 14) for storing one or more processing fluids removed from the drum. Desirably, the chemical waste reservoir is designed to contain all of the waste resulting from the use of all of the processing fluids contained in the chemical delivery system.

Referring back to FIG. 21, as described, scanner festoon box or casing 71 is provided at the outlet of dryer 17 to permit dried and processed film which exits dryer 17 to pass through conduit 70 and be rolled into scanner festoon box or casing 71. After being rolled into scanner casing 71, the film can be delivered to scanner 18'. With the photographic processor of the present invention (circular drum type), it is possible that an increased throughput through the processor would be realized. However, since the scanner speed may be slower than the processor speed, it is possible that film to be scanned would be backed up at the scanning station. In order to overcome this while maintaining the throughput of the processor, the present invention provides for a scanning section that is adapted to queue multiple rolls of processed film for scanning. More specifically, and with reference to FIG. 22, in a further feature of the present invention, a scanning section 6000 provided at the outlet of photographic processor 10 and dryer 17 includes scanner 18', as well as multiple festoon boxes or film holding casings 71a, 71b, 71c and 71d, similar to festoon box or casing 71 illustrated in FIG. 21. Each of film holding casings 71a–71d are rotatably and slidably positioned in an arcuate or curved guide slot 6002 provided in a plate member 6004 of scanning section 6000. Therefore, scanning section 6000 including plate member 6004 are provided adjacent to processing drum 14 so as to permit a transfer of dried processed film from dryer 17 through conduit 70 into an awaiting film holding casing 71a–71d. More specifically and utilizing 35 mm film as an example, when film exits dryer 17 as described with reference to FIG. 21, it passes through conduit 70 and enters into a waiting film holding casing 71a–71d for subsequent delivery to scanner 18'.

Figure 22:
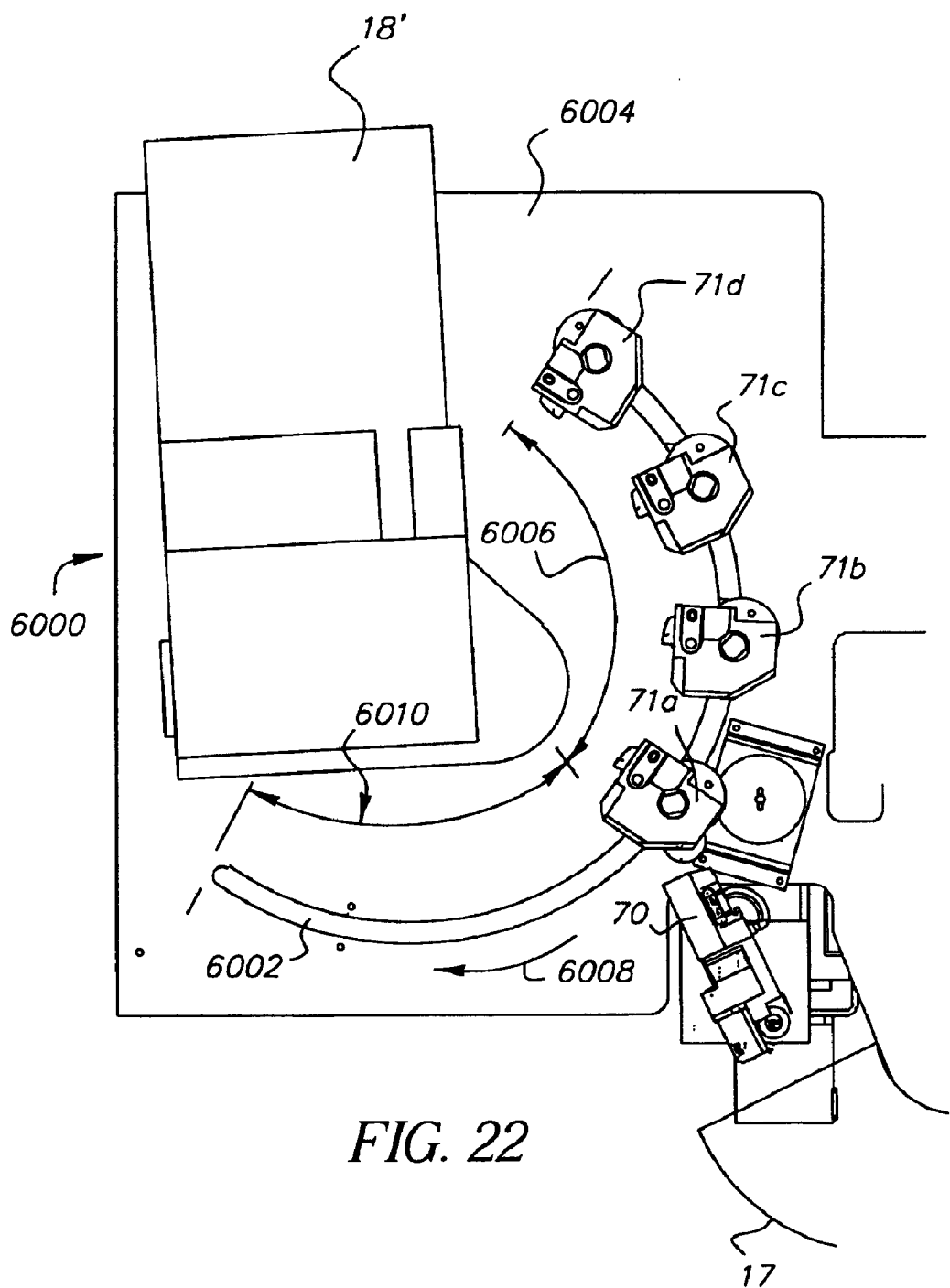
FIG. 22 illustrates a scanning section of the photographic processor of the present invention.

As shown in FIG. 22, arcuate or curved guide slot 6002 generally comprises a holding section 6006 which is sized to hold multiple empty film holding casings (in this case casings 71a–71d). When a processed and dried film is being delivered through conduit 70, the appropriate film holding casing, for example, first casing 71a is moved along slot 6002 in direction 6008 and rotated about its center axis to a loading position adjacent to conduit 70, so as to receive the dried and processed film. The film is conveyed through conduit 70 and into film holding casing 71a in a manner similar to the process described in FIG. 21 with reference to festoon box or casing 71. Thereafter, first film holding casing 71a is rotated and about its center axis moved along slot 6002 in the direction of arrow 6008 so as to permit the positioning of the next film holding casing 71b at conduit 70 to receive the next roll of dry processed film. This sequence continues as necessary to also insert dried processed film into film holding casings 71c and 71d. After each casing 71a–71d has film inserted therein, it is moved within guide slot 6002 towards a queuing section 6010 of guide slot 6002, so as to wait to be fed to scanner 18' when necessary.

Figure 23:
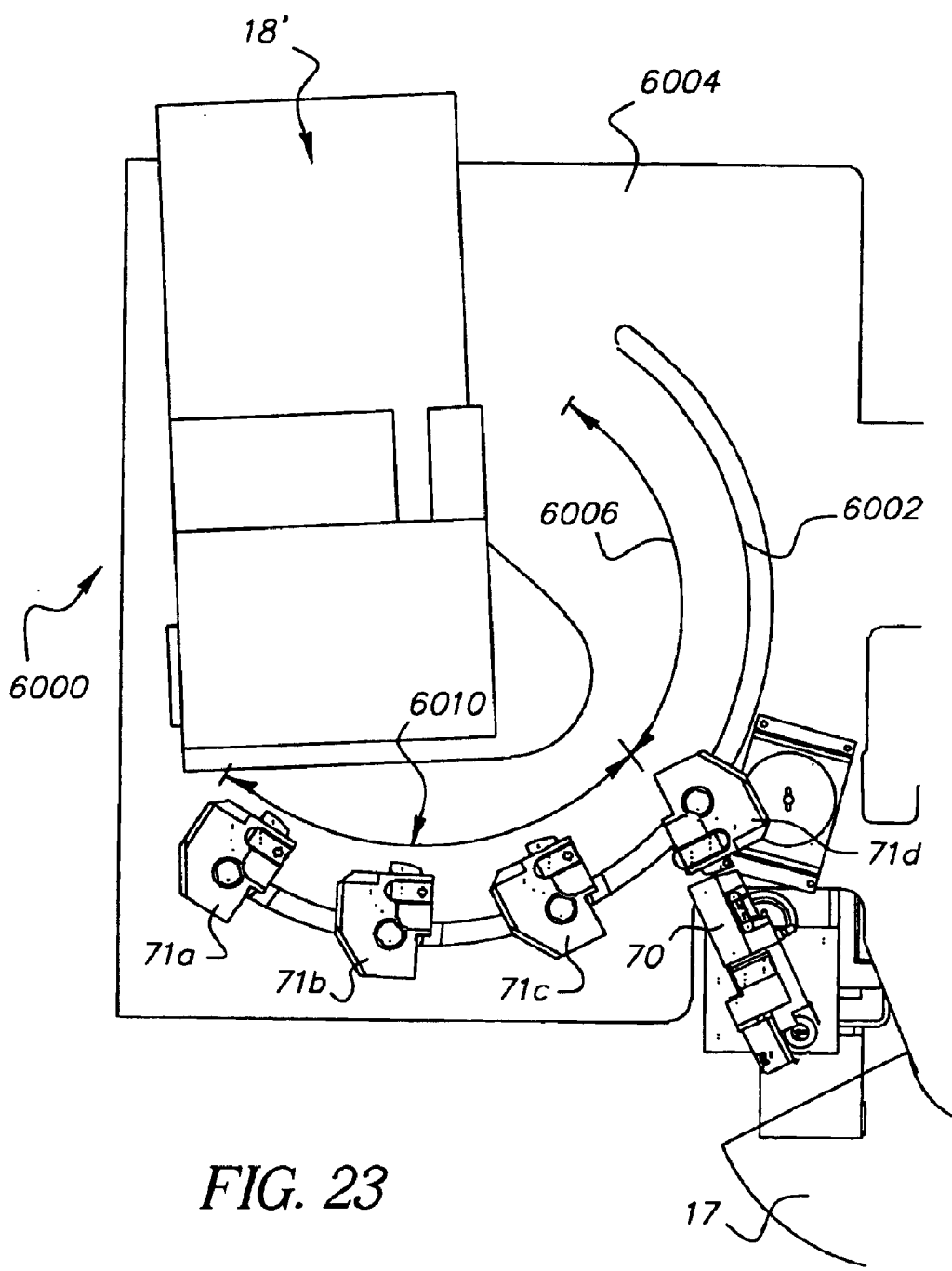
FIG. 23 is view of the scanning section of FIG. 22, wherein film holding casings in the scanning section have been moved to a queuing position.

With reference to FIG. 23, this figure shows a state in which the last film holding casing 71d is moved and rotated to a film loading position so as to permit the transfer of film through conduit 70 into film holding casing 71d. The remaining film holding casings 71a–71c may have already been filled with processed film and moved to the queuing position as shown. Although four film holding casings 71a–71d are illustrated, it is noted that the present invention is not limited to utilizing four film holding casings. The number of film holding casings depends on design considerations, the size of the film holding casings as well as the size of guide slot 6002.

Figure 24:
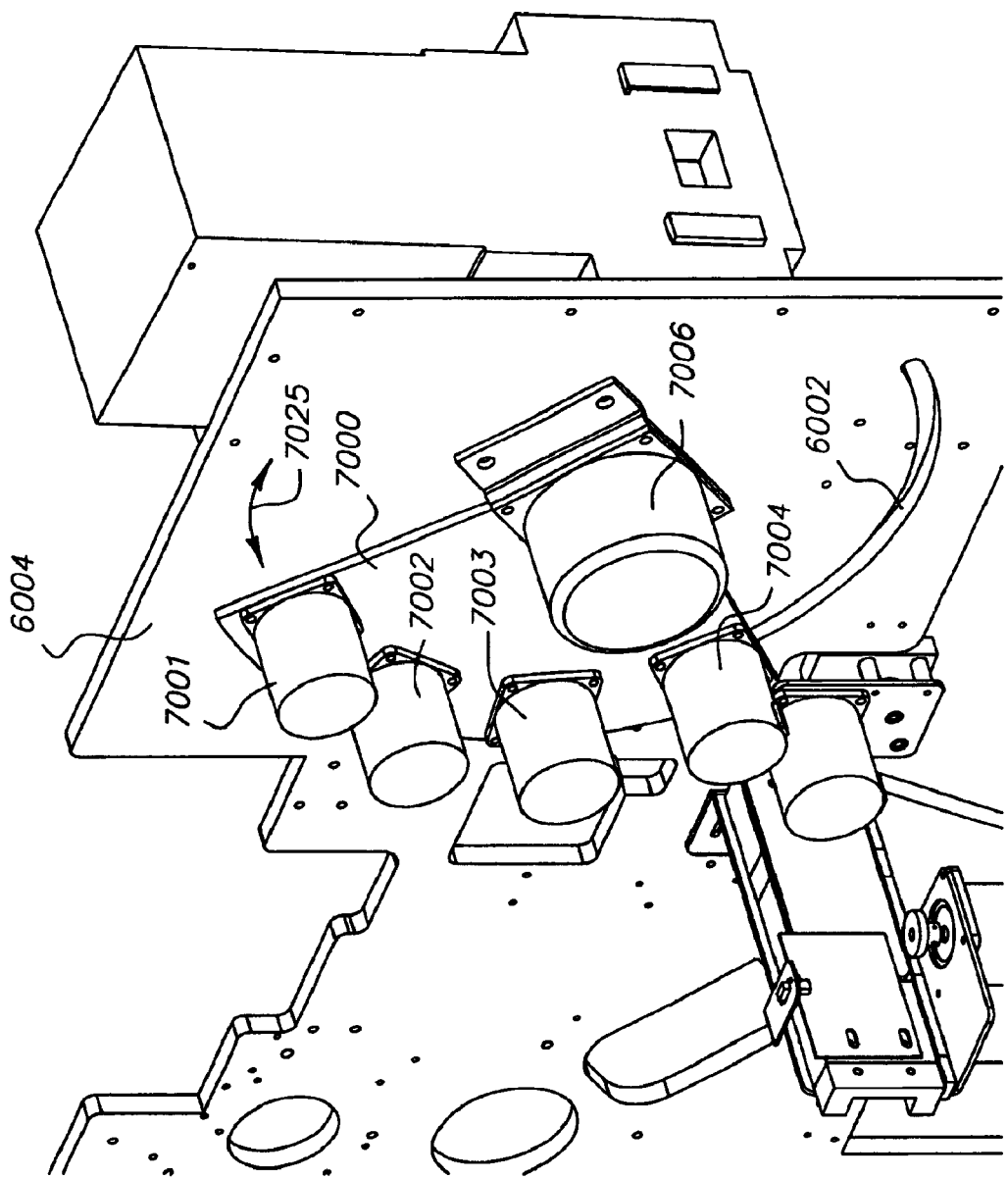
FIG. 24 is a view of the rear of the scanning section of FIG. 22.
Figure 25:
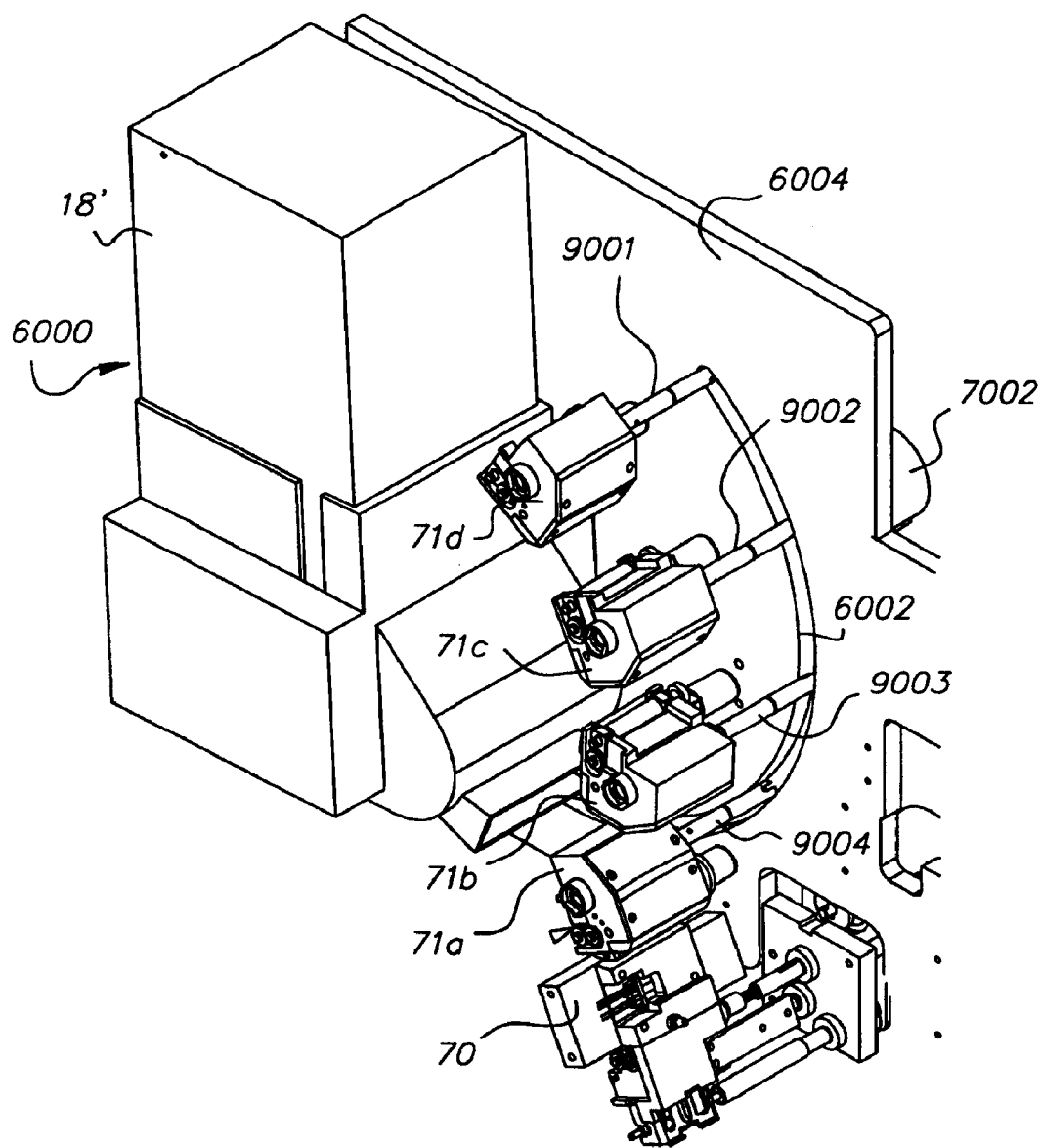
FIG. 25 is a further view of the scanning section.

FIG. 24 illustrates a rear view of plate member 6004 and shows one example of a mechanism for moving each of film holding casings 71a–71d along guide slot 6002, as well as rotating each of film holding casings 71a–71d about its center axis to rotate the casing between a loading position for loading film from conduit 70 into the respective film holding casing, and a supplying position to supply the film from each of the film holding casings to scanner 18'. More specifically, as shown in FIG. 24, plate member 6004 includes a motor 7006. Mounted on motor 7006 so as to be movable in opposite directions as shown by arrow 7025 relative to plate number 6004 is a further plate member 7000. Mounted on further plate member 7000 are motors 7001, 7002, 7003 and 7004. Each of motors 7001–7004 are operationally associated with a respective drive shaft 9001–9004 (FIG. 25) that is connected to a respective film holding casing 71a–71d. For example, motor 7004 drives shaft 9004 which is operationally associated with film holding casing 71a and thus, the actuation of motor 7004 will cause a rotation of drive shaft 9004 so as to rotate film holding casing 71a between a loading position for loading film from dryer 17 and a supply position to supply film to scanner 18' as described with reference to FIG. 21 and casing 71. Similar to casing 71, each of casings 71a–71d can further include a driven nip roller pair which can be driven by a further motor to drive the film into a respective casing and drive the film from the casing to the scanner.

Figure 26:
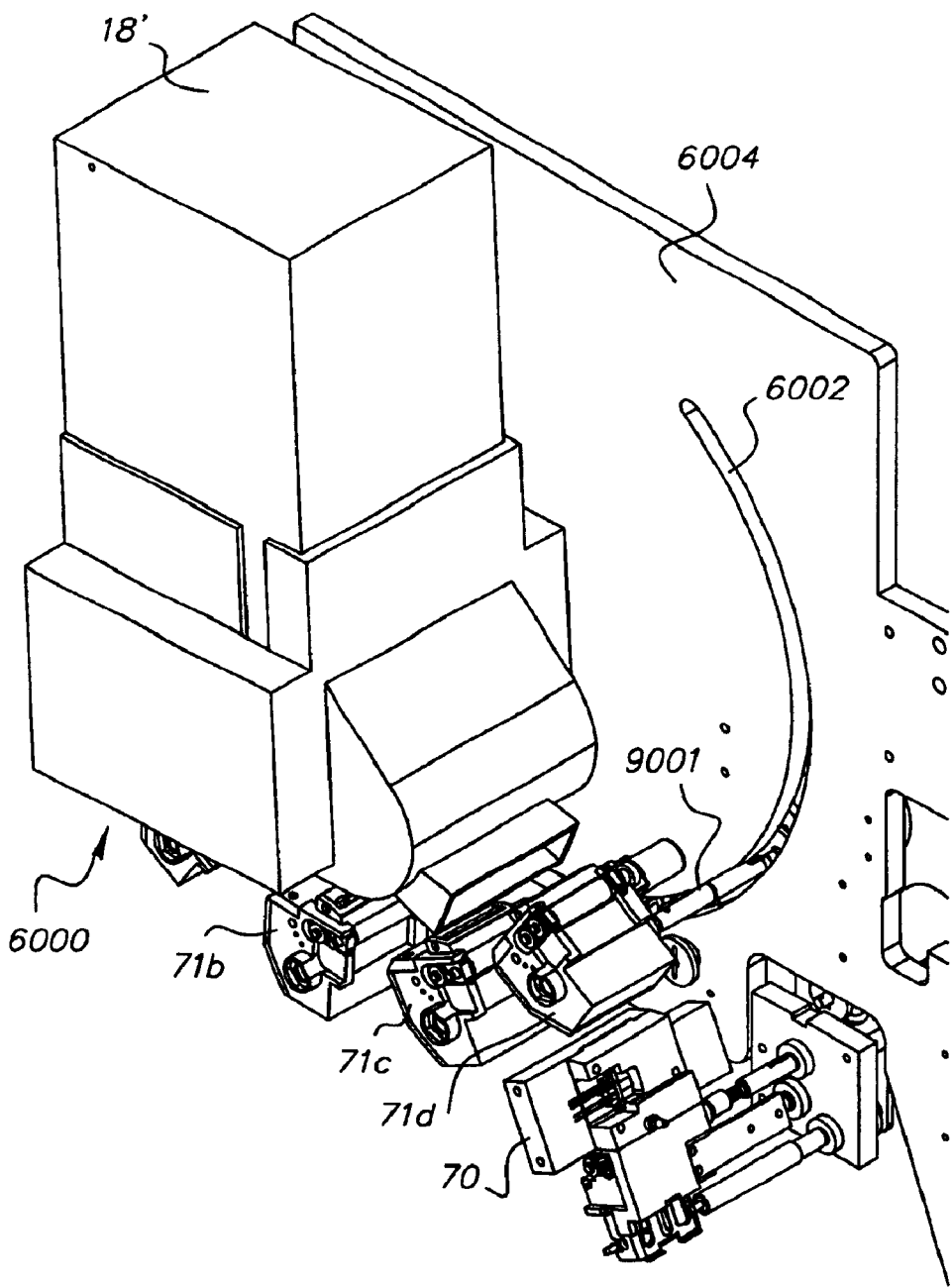
FIG. 26 is a view of the scanning section of FIG. 25, wherein the film holding casings have been moved to a queuing position.

Therefore, in operation and using film holding casing 71d as an example, film holding casing 71d can be moved and rotated to a film loading position by rotation of motor 7006 so as to move plate member 7000 to a position in which film holding casing 71d and motor 7001 are located at the film loading position shown in FIG. 23. At that point, motor 7001 and drive shaft 9001 can be actuated to rotate film holding casing 71d so that an opening of film holding casing 71d is opposite conduit 70 and therefore, places film holding casing 71d in a position to receive film from conduit 70 and specifically dried processed film from dryer 17 as also shown in FIG. 23. As described above, film holding casing 71d like festoon box or casing 71 can include nip rollers similar to rollers 72 of casing 71 which pull the film into the film holding casing in the same manner as described with respect to casing 71 of FIG. 21. Thereafter, once the film is inserted into casing 71d, motor 7006 on plate member 7000 can be rotated to place film holding casing 71d in queuing section 6010, waiting to be supplied to scanner 18'. When it is desired to supply the dried processed film to scanner 18', motor 7006 is actuated to move plate member 7000 and therefore place the film holding casing, for example, film holding casing 71d in the position illustrated in FIG. 26. It is noted that motor 7001 drives shaft 9001 associated with film holding casing 71d, to rotate casing 71d to the supply position as shown in FIG. 26 to permit the supply of the film from casing 71d to scanner 18'. The same motor used to drive film into casing 71a can be used to drive the film into scanner 18'.

Therefore, with the arrangement of the present invention, film such as 35 mm film can be processed in processing drum 14 as previously described, and dried within dryer 17 as also previously described. After drying, a first film holding casing 71a can be positioned in a film receiving position along guide slot 6002 (see FIG. 23) so as to receive film from conduit 70. By moving casings 71a–71d along slot 6002, subsequent films can be processed, dried and placed in film holding casings 71b, 71c, 71d.

Further, with the arrangement of the present invention, a first film holding casing, such as casing 71a, can be rotated about its axis between a first position to receive film from conduit 70 (see, for example, film holding casing 71d in FIG. 23), and a second position (see, for example, casing 71d in FIG. 26) to deliver the film to scanner 18'. As an alternative, casing 71a can be moved to queuing position 6010, and thereafter, the next film that is in processor 14 can be placed in the next film holding casing 71b and also queued for scanning, rather than waiting for the film scanner to complete the scanning of film which may be in the scanner. For example, in the event that the scanner has not yet finished scanning the first film from casing 71a, plate member 7000 through motor 7006 (FIG. 24) can be rotated to place the next film holding casing 71b at the film loading position and thus provide film in film holding casing 71b. Essentially, depending on the throughput of the processor and the scanning speed, the present invention permits a user to queue one or more rolls of processed film for scanning, and supply film to the scanner from a selected film holding casing in an efficient manner. The arrangement of the present invention also permits a user to monitor the processing and scanning speeds and accordingly, queue film for scanning, if necessary, without affecting the throughput of the processor.

Figure 27:
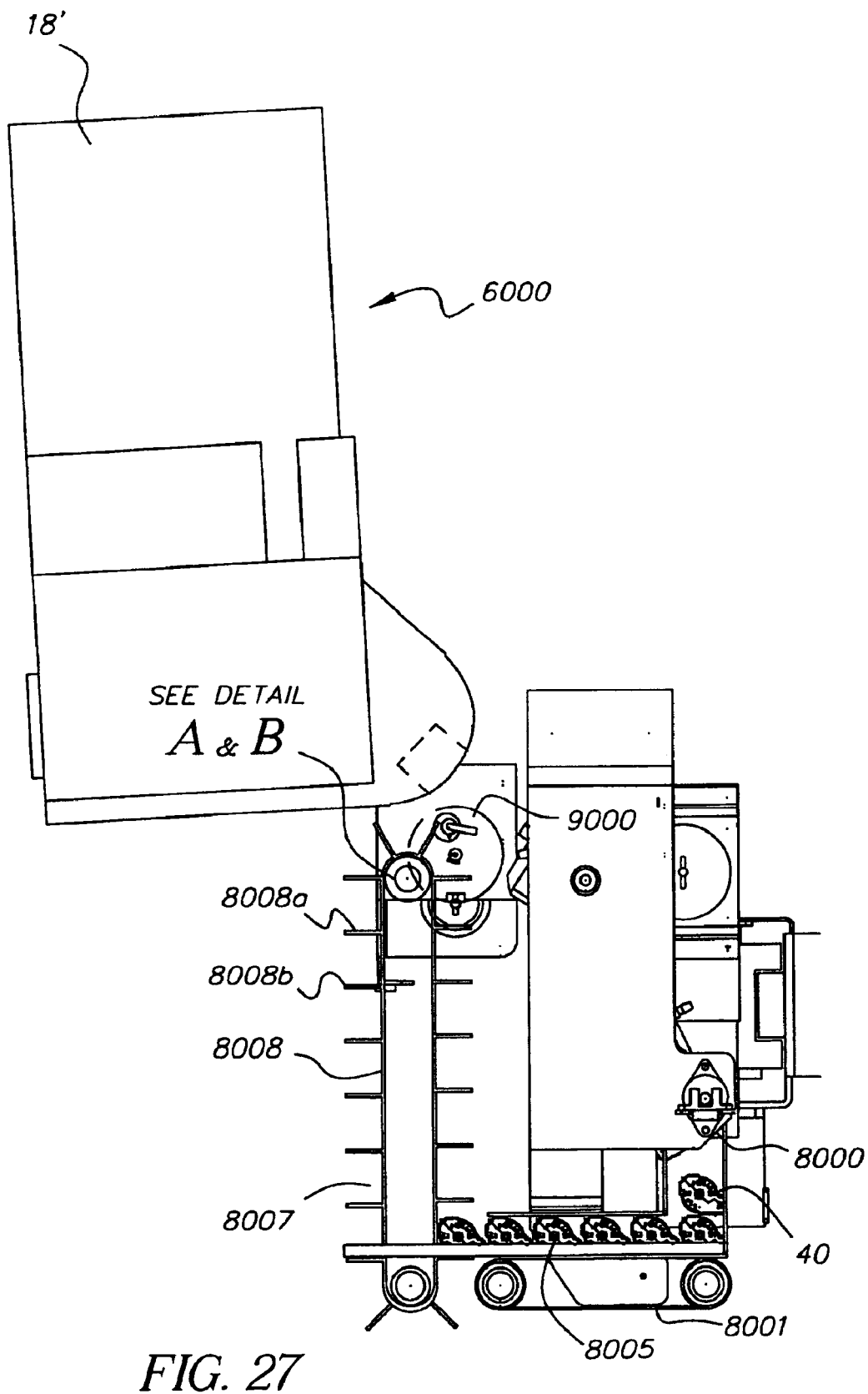
FIG. 27 is a view of a further embodiment of the scanning section.
Figure 30:
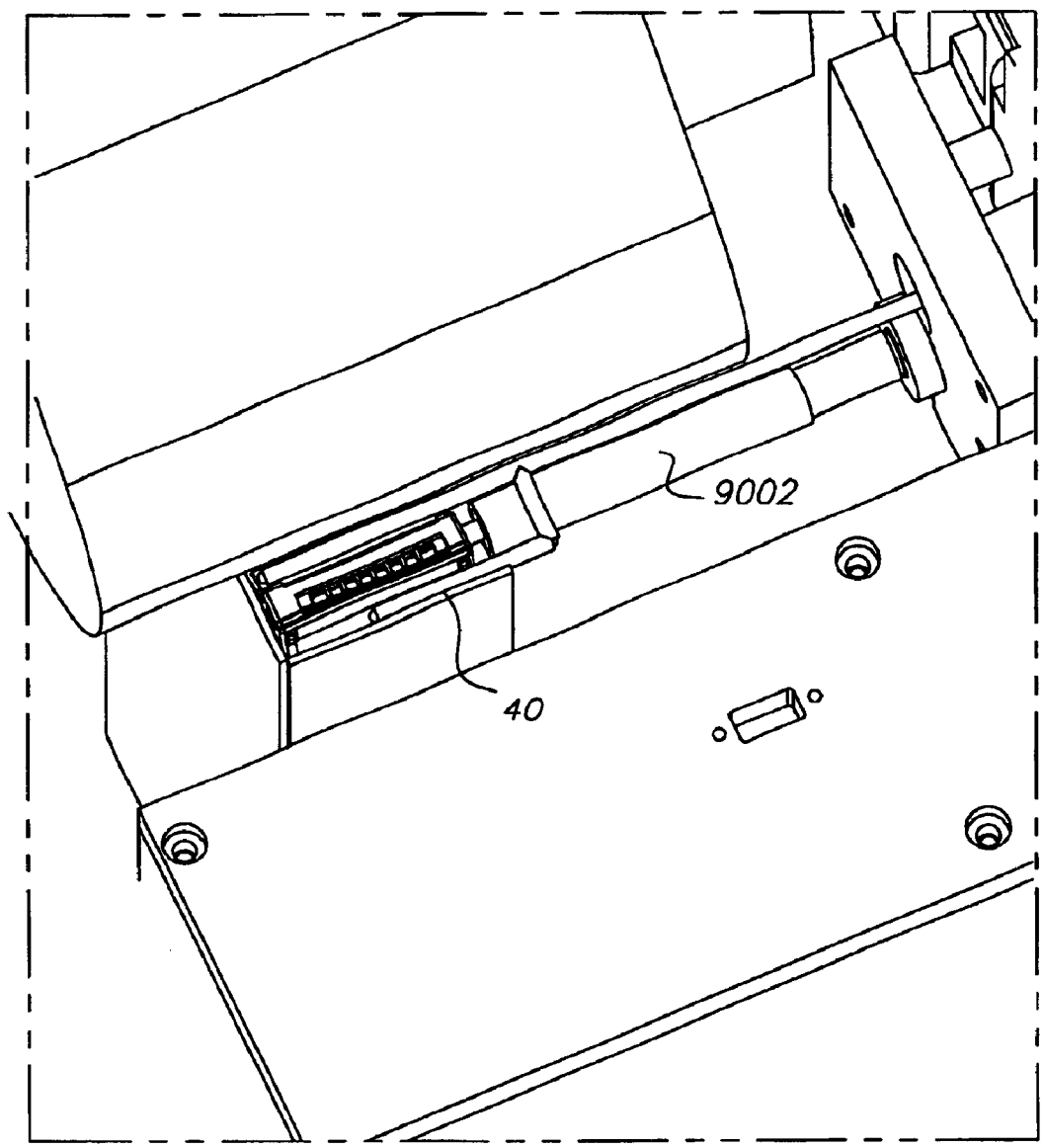
FIG. 30 is a detailed view of a film cartridge moving arm of the scanning section of FIG. 27.

The above has been described with reference to 35 mm film, however, the present invention is not limited to 35 mm film, and is applicable to any film or media which can be detached from its cartridge during processing. Also, a cuing arrangement for film which can remain attached to its cartridge during processing, such as APS film, can also be utilized within the contexts of the present invention. More specifically, as illustrated in FIG. 27, a queuing arrangement is also applicable to film which remains with the cassette such as APS film. For APS film and with a processor of the circular type as described, once dried, the film can be rewound back into its cartridge 40 prior to proceeding to scanner 18' as described with reference to FIGS. 15A and 15B. As shown in FIG. 27, in a feature of the present invention, after the dried processed film is rewound back into cartridge 40, cartridge 40 can be manually or automatically inserted into a scanner section input 8000 so as to be dropped onto a conveyer 8001. Conveyor 8001 transports cartridges 40 having dried processed APS film therein along a pathway 8005 and to an elevator arrangement 8007. Elevator arrangement 8007 basically comprises a belt type member 8008 having compartments defined by walls 8008a and 8008b (see details A and B of FIGS. 28 and 29). Thus, conveyer 8001 delivers a cartridge 40 into a compartment defined by walls 8000a, 8000b and elevator arrangement 8007 for transporting a cartridge in an upward direction towards scanner 18'. When a cartridge 40 is placed at a scanner entry position 9000, cartridge 40 can be manipulated through use of, for example, a projection arm 9002 as shown in FIG. 30, which is adapted to align the opening in cartridge 40 with the opening in scanner 18'. At that point, a motor and drive shaft arrangement can be adapted to drive the film out of the cartridge 40 into scanner 18' for scanning. This permits multiple rolls of APS film to be queued for scanning to maintain the throughput of the processor.

Therefore, the present invention provides for a unique arrangement for queuing processed and dried film to be scanned. The invention is applicable to multiple types of film such as APS and 35 mm film. Further, although a circular dryer has been described with reference to the processor, the present invention is not limited thereto. It is recognized that the scanning or queuing arrangement on of the present invention is applicable to multiple types of processor and scanner combinations where throughput, processing speed and scanning speed are considerations.

The invention has been described in detail with particular reference to certain preferred embodiments thereof, but it will be understood that variations and modifications can be effected within the spirit and scope of the invention.

What is claimed is:

1. A processing arrangement comprising:
   a film processing section adapted to process a photographic film; and
   a scanning section including a scanner adapted to scan said processed photographic film;
   said scanning section comprising a plate member having a guide slot therein and a plurality of film holding casings movably located in said guide slot, each of said film holding casings being movable to a receiving position along said guide slot in a vicinity of an outlet of said processing section and being adapted to receive a processed film from said processing section and hold the processed film therein, each of said film holding casings being further adapted to transfer processed film held therein from the film holding casing to the scanner.

2. A processing arrangement according to claim 1, wherein said guide slot comprises at least a holding section which is sized to hold multiple empty film holding casings prior to movement to the receiving position to receive processed film, and a queuing section which is sized to hold multiple film holding casings having processed film therein prior to a transfer of the film to the scanner.

3. A processing arrangement according to claim 1, wherein each of said film holding casings is further rotatable about a center axis to locate an opening of said film holding casing adjacent to the outlet of the processing section or adjacent to an inlet of the scanner.

4. A method of processing photographic film, the method comprising the steps of:
   supplying a film to be processed to a processing section of a processing arrangement;
   processing said film to develop images on said film;
   transferring said film from said processing section to a film holding queuing casing, wherein said film is rolled up in said queuing casing; and
   transferring said film from said queuing casing to a scanner.

5. A method according to claim 4, wherein said step of transferring said film from said processing section to a film holding queuing casing comprises:
   moving an empty casing along a guide slot from a first position along said guide slot which is sized to hold multiple casings to a second position along said guide slot in a vicinity of an exit from the processing section where said casing is adapted to receive the processed film from the processing section.

6. A method according to claim 4, wherein said step of transferring the film from said casing to the scanner comprises:
   moving a casing having processed film therein to a queuing position along said guide slot which is sized to hold multiple casings having processed film therein;
   maintaining said casing at said queuing position for a period of time;
   moving said casing to a scanner entry position along said guide slot after said period of time;
   rotating the casing to align an opening on the casing with an inlet to the scanner; and
   transferring the processed film from said casing to the scanner.

7. A processing arrangement comprising:
   a film processing section adapted to remove a photographic film from a cartridge to process the photographic film and return the processed photographic film back into the cartridge; and
   a scanning section including a scanner adapted to scan said processed photographic film;
   said scanning section comprising a conveyor adapted to hold and convey multiple cartridges having said processed photographic film therein and convey the film cartridges to an entrance of the scanner, to permit a transfer of the processed film from the cartridge to the scanner.

* * * * *